US012681272B2

(12) United States Patent
　Lee

(10) Patent No.: US 12,681,272 B2
(45) Date of Patent: Jul. 14, 2026

(54) LENS ASSEMBLY AND ELECTRONIC DEVICE INCLUDING THE SAME

(71) Applicant: Samsung Electronics Co., Ltd., Gyeonggi-do (KR)

(72) Inventor: Yongjae Lee, Gyeonggi-do (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 513 days.

(21) Appl. No.: 18/089,913

(22) Filed: Dec. 28, 2022

(65) Prior Publication Data

US 2023/0204924 A1　Jun. 29, 2023

Related U.S. Application Data

(63) Continuation of application No. PCT/KR2022/021546, filed on Dec. 28, 2022.

(30) Foreign Application Priority Data

Dec. 28, 2021　(KR) ........................ 10-2021-0189978
Mar. 18, 2022　(KR) ........................ 10-2022-0034263

(51) Int. Cl.
*G02B 13/00* (2006.01)
*G02B 9/60* (2006.01)
*G02B 13/02* (2006.01)

(52) U.S. Cl.
CPC ........... *G02B 13/0045* (2013.01); *G02B 9/60* (2013.01); *G02B 13/0065* (2013.01); *G02B 13/02* (2013.01)

(58) Field of Classification Search
CPC .. G02B 13/0045; G02B 9/60; G02B 13/0065; G02B 13/02
See application file for complete search history.

(56) References Cited

U.S. PATENT DOCUMENTS

| | | |
|---|---|---|
| 8,049,886 B1 | 11/2011 | Raksi |
| 2015/0042870 A1 | 2/2015 | Chan et al. |
| 2017/0276912 A1 | 9/2017 | Yao et al. |
| 2019/0056566 A1 | 2/2019 | Yoo et al. |
| 2019/0324233 A1 | 10/2019 | Chen |

(Continued)

FOREIGN PATENT DOCUMENTS

| | | | |
|---|---|---|---|
| CN | 111812806 A | 10/2020 | |
| CN | 112526709 A * | 3/2021 | ............. G03B 30/00 |

(Continued)

OTHER PUBLICATIONS

JP 2008209712, translation (Year: 2008).*

(Continued)

*Primary Examiner* — Wen Huang
(74) *Attorney, Agent, or Firm* — Sughrue Mion, PLLC

(57) ABSTRACT

According to an embodiment of the disclosure, there may be provided an electronic device, comprising the lens assembly including a plurality of lenses arranged along a direction of an optical axis from an object side to an image side; an optical member disposed closer to the object side than the lens assembly and configured to reflect or refract external light incident in a direction crossing the optical axis to be incident on the lens assembly along the direction of the optical axis; and an image sensor. The electronic device may implement a telephoto lens with reduced chromatic aberration.

13 Claims, 18 Drawing Sheets

(56)                    References Cited

U.S. PATENT DOCUMENTS

| 2020/0174232 | A1 | 6/2020 | Goldenberg et al. |
| 2020/0355910 | A1 | 11/2020 | Smolka et al. |
| 2021/0063703 | A1 | 3/2021 | Byun et al. |
| 2021/0063704 | A1 | 3/2021 | Son et al. |
| 2021/0231922 | A1 | 7/2021 | Sekine et al. |
| 2021/0373285 | A1 | 12/2021 | Peng |

FOREIGN PATENT DOCUMENTS

| JP | 2008-209712 | A | 9/2008 |
| JP | 2021-15142 | A | 2/2021 |
| JP | 2021-189426 | A | 12/2021 |
| KR | 10-2013-0138262 | A | 12/2013 |
| KR | 10-2019-0020421 | A | 3/2019 |
| KR | 10-2019-0088715 | A | 7/2019 |
| KR | 10-2020-0062042 | A | 6/2020 |
| KR | 10-2021-0027187 | A | 3/2021 |
| KR | 10-2021-0027189 | A | 3/2021 |

OTHER PUBLICATIONS

CN-112526709-A, translation (Year: 2021).*
International Search Report dated Mar. 30, 2023.
Extended European Search Report dated Dec. 3, 2024.
Communication dated Mar. 11, 2026, issued by the European Patent
Office in European Application No. 22916766.3.
Communication dated May 27, 2026, issued by Intellectual Property
India in Indian Application No. 202417052625.

* cited by examiner

LONGITUDINAL
SPHERICAL ABER.

| | 656.3000NM |
| --- | --- |
| | 587.6000NM |
| | 546.1000NM |
| | 486.1000NM |
| | 435.8000NM |

FOCUS (MILLIMETERS)

LONGITUDINAL
SPHERICAL ABER.

| | 656.3000NM |
| | 587.6000NM |
| | 546.1000NM |
| | 486.1000NM |
| | 435.8000NM |

FOCUS (MILLIMETERS)

LONGITUDINAL
SPHERICAL ABER.

| | 656.3000NM |
| | 587.6000NM |
| | 546.1000NM |
| | 486.1000NM |
| | 435.8000NM |

FOCUS (MILLIMETERS)

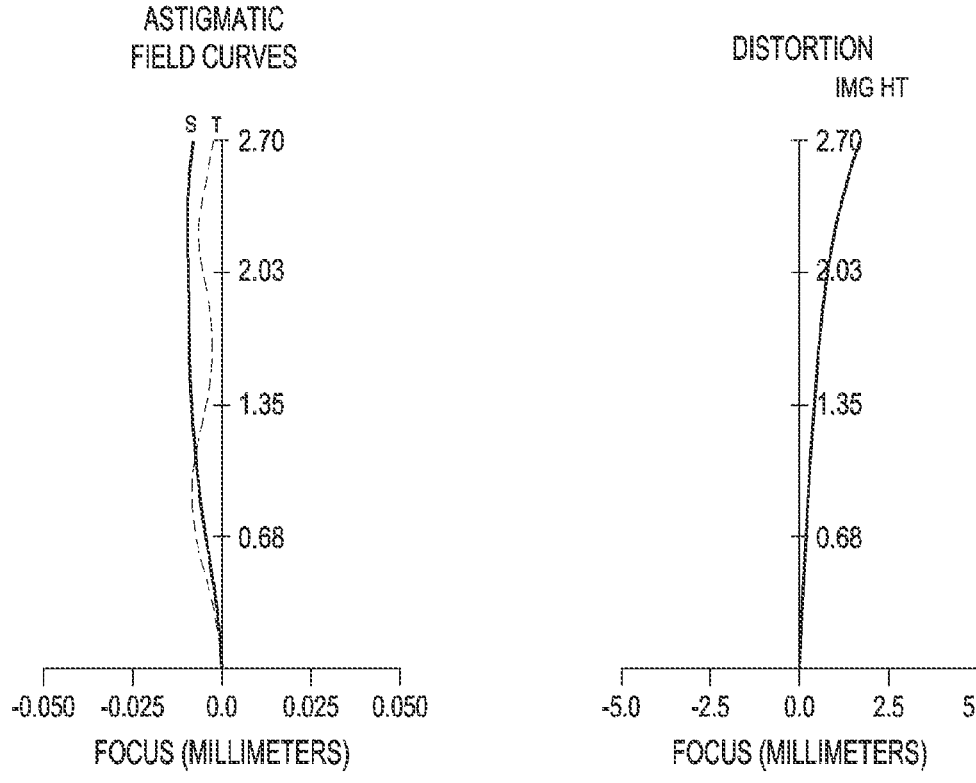
FIG. 11                    FIG. 12

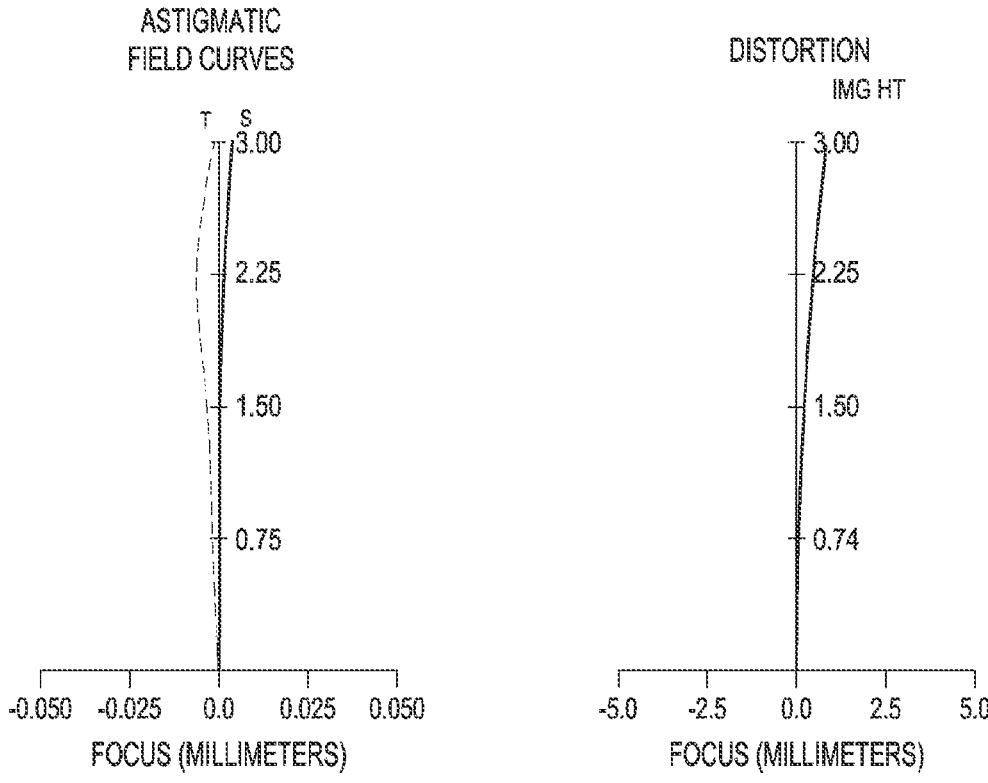
FIG. 15                    FIG. 16

LENS ASSEMBLY AND ELECTRONIC DEVICE INCLUDING THE SAME

CROSS REFERENCE TO RELATED APPLICATIONS

This application is a continuation of International Application No. PCT/KR2022/021546 designating the United States, filed on Dec. 28, 2022, in the Korean Intellectual Property Receiving Office and claiming priority to Korean Patent Application No. 10-2021-0189978, filed on Dec. 28, 2021, in the Korean Intellectual Property Office, and Korean Patent Application No. 10-2022-0034263, filed on Mar. 18, 2022, in the Korean Intellectual Property Office, the disclosures of all of which are incorporated by reference herein in their entireties.

BACKGROUND

Technical Field

Various embodiments of the disclosure relate to a lens assembly and, more specifically, to a lens assembly constituting a folded optical system and an electronic device including the same.

Description of Related Art

To obtain high-quality images and/or videos, an optical device may include an optical system. The optical system may include a lens assembly including a plurality of lenses and an image sensor having a high pixel count. The lens assembly may have a lower F-number and smaller aberration. This makes it possible to obtain high-quality (high resolution) images and/or videos. Obtaining a lower F number and smaller aberration, that is, a higher resolution and brighter images, calls for a combination of multiple lenses. If including more pixels, the image sensor may have a higher pixel count, and an image sensor with a higher pixel count may obtain higher-resolution images and/or videos. To implement a high-pixel image sensor in a limited mounting space in an electronic device, a plurality of pixels having a very small size, e.g., pixels in micrometers, may need be disposed.

Portable electronic devices are becoming more compact and slimmer for ease to carry, and optical systems equipped in electronic devices are required to have a compact lens structure with a shorter overall length. However, telephoto lenses in which the overall length of the optical system increases in proportion to the focal length may be difficult to equip in small electronic devices.

SUMMARY

According to various embodiments of the disclosure, there may be provided an electronic device, comprising the lens assembly including a plurality of lenses arranged along a direction of an optical axis from an object side to an image side; an optical member disposed closer to the object side than the lens assembly and configured to reflect or refract external light incident in a direction crossing the optical axis to be incident on the lens assembly along the direction of the optical axis; and an image sensor, wherein the plurality of lenses includes a first lens, a second lens, a third lens, and a fourth lens, sequentially arranged along a direction of the optical axis, and wherein the lens assembly may satisfy conditional equation 1 and conditional equation 2.

$$\left| \sum \frac{f}{f_i v_d} \right| \leq 0.05 \qquad \text{[conditional equation 1]}$$

$$FOV \leq 25 \ deg \qquad \text{[conditional equation 2]}$$

where 'f' is a focal length of each of the lenses except for a lens closest to the image side among the lenses included in the lens assembly, '$f_t$' is a focal length of an overall optical system, and '$v_d$' is an Abbe's number of each lens, and 'FOV' is a field of view of the overall optical system.

According to various embodiments of the disclosure, it is possible to advantageously reduce and/or prevent various aberrations including chromatic aberration by optimizing the focal length and refractive index of the lenses included in the lens assembly in implementing a telephoto lens in a folded optical system.

According to various embodiments of the disclosure, the lens assembly may easily be equipped in a small and/or lightweight electronic device and contribute to expanding the optical functionality or enhancing the optical performance of the electronic device.

BRIEF DESCRIPTION OF THE DRAWINGS

FIG. 11 is a graph illustrating the astigmatism of a lens assembly according to the embodiment of FIG. 9;

FIG. 12 is a graph illustrating the distortion of a lens assembly according to the embodiment of FIG. 9;

FIG. 15 is a graph illustrating the astigmatism of a lens assembly according to the embodiment of FIG. 13;

FIG. 16 is a graph illustrating the distortion of a lens assembly according to the embodiment of FIG. 13;

DETAILED DESCRIPTION

Figure 1:
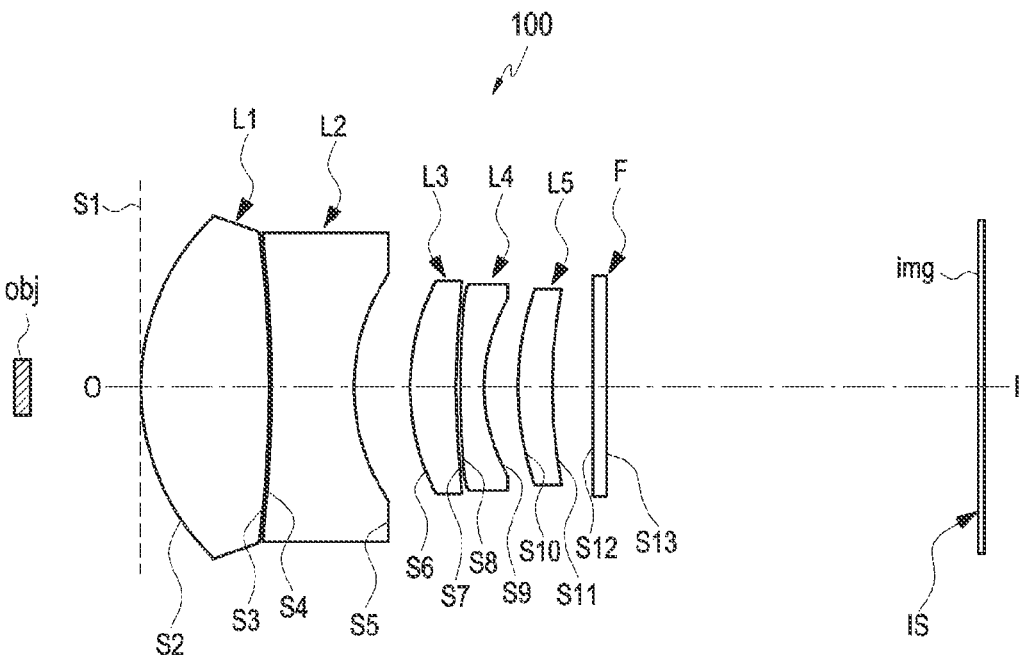
FIG. 1 is a view illustrating a configuration of an optical system including an image sensor and a lens assembly according to an embodiment.

Proposed to address this issue is a technique to allow for easier equipment in the electronic device by placing a curved member (e.g., a mirror or prism) before the lens assembly to form a folded optical system constituted of two or more light paths. The folded optical system performs image stabilization by having an image stabilization driver in the lens assembly or a curved member. The telephoto lens may be more sensitive to handshakes or vibrations as much as its focal length increases so it may have increased aberration. Thus, image stabilization is more necessary in configuring a telephoto lens with a folded optical system. Meanwhile, the curved member may be required to secure a space where it may be rotated for image stabilization, which may hinder ease to equip in the electronic device.

According to an embodiment of the disclosure, there are provided a lens assembly including a folded optical system, which may be easy to equip in an electronic device and secure the performance of image stabilization and is advantageous in correcting aberrations including chromatic aberration and an electronic device.

According to an embodiment of the disclosure, it is possible to advantageously reduce and/or prevent various aberrations including chromatic aberration by optimizing the focal length and refractive index of the lenses included in the lens assembly in implementing a telephoto lens in a folded optical system.

According to an embodiment of the disclosure, the lens assembly may easily be equipped in a small and/or light-weight electronic device and contribute to expanding the optical functionality or enhancing the optical performance of the electronic device.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. The terms, such as "first," "second," "first," or "second," may modify the relevant components regardless of order or importance and are used merely to distinguish one component from another, rather than limiting the components. When an (e.g., first) component is referred to as being "connected (functionally or communicatively)" or "connected" to another (e.g., second) component, the component may be connected to the other component directly or via another component (e.g., a third component).

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the electronic device may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a media box (e.g., Samsung HomeSync™, Apple TV™, or Google TV™), a gaming console (Xbox™ or PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs) of financial organizations, point of sales (POS) devices of stores, or Internet of things devices (e.g., a bulb, various sensors, a sprinkler, a fire alarm, a thermostat, a street light, a toaster, fitness equipment, a hot water tank, a heater, or a boiler). According to an embodiment of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device. According to an embodiment of the present invention, the electronic device is not limited to the above-listed embodiments.

Although limits or limitations to some numbers may be proposed herein, it should be noted that an embodiment of the disclosure are not limited by such numbers as long as the numbers are not shown in the claims.

FIG. 1 is a view illustrating a configuration of an optical system including an image sensor and a lens assembly according to one of an embodiment of the disclosure.

A lens assembly 100 may include four or more lenses. For example, referring to FIG. 1, the lens assembly 100 include five lenses. An image sensor IS may be disposed in an electronic device. The lens assembly 100 including a plurality of lenses (e.g., L1, L2, L3, L4, and L5) may be mounted in the image sensor (IS)-equipped electronic device. The electronic device may be, e.g., a camera. The electronic device may be understood to further include a housing that protects the internal components.

The image sensor IS may be a sensor that is mounted on a circuit board (not shown) that is aligned with the optical axis O-I and responds to light. The image sensor IS may include such a sensor as a complementary metal-oxide semiconductor (CMOS) or charge coupled device (CCD) sensor. The image sensor IS, however, is not limited thereto but may rather include various elements that convert light, e.g., an object image, into an electrical image signal. The image sensor IS may detect brightness, contrast ratio information, or color information about the object from the light which has been transmitted through the plurality of lenses (e.g., L1, L2, L3, L4, and L5), thereby obtaining an image for the object.

The plurality of lenses (e.g., L1, L2, L3, L4, and L5) included in the lens assembly 100 may include lenses formed of glass and/or synthetic resin (e.g., plastic) material. The lens assembly 100 may have a field of view of about 25 degrees or less by a combination of the plurality of lenses. A telephoto lens may be implemented using the lens assembly 100 having a field of view of 25 degrees or less. The image sensor IS may have a substantially rectangular (e.g., square) shape with the optical axis OI as a normal line, while generally forming a thin plane. Further, the image sensor IS may have a size of 2.7 mm or more image height (ImagH), and may be formed to have hundreds of thousands pixels to tens of millions to hundreds of millions of pixels. For reference, image height ImagH may mean half of the diagonal length of the image sensor.

The lens assembly 100 may be disposed on the optical axis O-I passing through the centers of the plurality of lenses from the object (or external object) side O to the image side I. The optical axis O-I may be substantially orthogonal to the surfaces at the center of each lens, as well as the image sensor IS. In describing the configuration of each lens below, 'object side' may denote the direction in which the object is present, and 'image side' may denote the direction in which an imaging plane img where an image forms is present. The 'object side-facing surface' of a lens may denote a surface towards the object on the optical axis O-I, which may mean the left (or front) surface of the lens as viewed from above the drawings, and the 'image side-facing surface' of the lens may denote a surface towards the imaging plane img on the optical axis O-I, which may mean the right (or rear) surface of the lens as viewed from above the drawings of the disclosure. The imaging plane img may be a portion where, e.g., an image capturing element or image sensor IS is disposed, and an image forms.

Facing the object side O along the optical axis O-I with respect to at least one lens among the plurality of lenses included in the lens assembly 100 may be defined as 'facing in the first direction,' and facing the image side I along the optical axis O-I may be defined as 'facing in the second direction.' When a lens (e.g., a first lens L1) includes an object side (O)-facing surface, the object side (O)-facing surface may be said to face in the first direction. When a lens (e.g., the first lens L1) has an image side (I)-facing surface, the image side (I)-facing surface may be said to face in the second direction. Further, when the surface of each lens faces in the first direction or second direction in a state in which the center of the image sensor IS and/or the plurality of lenses is positioned on the optical axis O-I may be defined an the 'optical system including the plurality of lenses and/or the image sensor IS is aligned along the optical axis.'

In describing the plurality of lenses (e.g., L1, L2, L3, L4, and L5), the portion of each lens, which is close to the optical axis O-I may be referred to as a chief portion, and the portion further from the optical axis O-I (or around the edge of the lens) may be referred to as a marginal portion. The chief portion may be, e.g., a portion of a lens (e.g., the first lens L1) which crosses the optical axis O-I. The marginal portion may be, e.g., a portion of the lens (e.g., the first lens L1) which is spaced apart from the optical axis by a predetermined distance. The marginal portion may include an end portion of the lens which is positioned farthest from the optical axis O-I of the lens.

The radius of curvature, thickness, optical total length (OTTL), and focal length of a lens as described herein may be in millimeters unless stated otherwise. Further, the thickness of the lenses, the distance between the lenses, the air gap, and an optical total length from image plane (OTTL) (or overall length (OAL)) may be distances measured from the optical axis of the lens. In describing the shape of a lens, 'one surface of the lens is convex' may mean that the portion of the surface that intersects the optical axis is convex, and 'one surface of the lens is concave' may mean that the portion of the surface that intersects the optical axis is concave. Thus, although one surface of a lens (e.g., the optical axis portion of the surface) is described as convex in shape, edge portions of the lens (e.g., portions a predetermined distance apart from the optical axis portion of the surface) may be concave. Likewise, although one surface of a lens (e.g., the optical axis portion of the surface) is described as concave in shape, edge portions of the lens (e.g., portions a predetermined distance apart from the optical axis portion of the surface) may be convex. As used herein, the term 'inflection point' may mean a point where the radius of curvature changes in a portion which does not cross the optical axis.

The lens assembly 100 may be advantageous in correcting aberrations including chromatic aberration by including a plurality of lenses. Referring to FIG. 1, The lens assembly 100 may include five lenses (e.g., L1, L2, L3, L4, and L5) sequentially arranged in the optical axis O-I direction. The five lenses may be denoted as the first lens L1, the second lens L2, the third lens L3, the fourth lens L4, and the fifth lens L5 sequentially from the object side O. The plurality of lenses (e.g., L1, L2, L3, L4, and L5) may be aligned with the image sensor IS and the optical axis O-I.

To configure a telephoto lens, the first lens L1 included in the lens assembly 100 may have a positive refractive power, and the second lens L2 may have a negative refractive power. Further, the third lens L3 may have a positive refractive power, and the fourth lens L4 may have a negative refractive power. Further, the fifth lens L5 may have a positive or negative refractive power. In the above-described embodiments, if light parallel with the optical axis O-I is incident onto the lens with a positive refractive power, the light, after passing through the lens, may be focused. For example, the lens with a positive refractive power may be a lens based on the principle of a convex lens. In contrast, if parallel light is incident onto the lens with a negative refractive power, the light, after passing through the lens, may be dispersed. For example, the lens with a negative refractive power may be a lens based on the principle of a concave lens.

In the embodiment of FIG. 1, the first lens L1 has a positive refractive power and may have a surface S2 convex to the object side O to collect light. However, the first lens L1 has a positive refractive power and may have a larger effective diameter than that of other lenses to collect a large amount of light. In other words, an ultra-wide field of view may be implemented using the first lens L1. The fifth lens L5 having a negative refractive power may also have a surface S10 convex to the object side O to facilitate to secure the amount of light at the marginal portion by reducing the angle of incidence of the light incident on the image plane img. By forming the surface S10 of the fifth lens L5 toward the subject side O to be convex, it is possible to effectively remove astigmatism, which is a failure to form a clear image through the marginal portion of the lens or to correct field curvature.

The first lens L1 and the second lens L2 may be configured as large-diameter lenses which have a relatively large effective diameter than the other lenses (the third lens L3, the fourth lens L4, and the fifth lens L2) in the lens assembly 100. Here, 'effective diameter' may mean a distance between one end and the other end of the lens in a direction perpendicular to the optical axis OI. The first lens L1 has a positive refractive power and may have a larger effective diameter than that of other lenses to collect a large amount of light. The second lens L2 has a negative refractive power, is paired with the first lens L1, and is disposed adjacent to the first lens L1 to disperse the collected light. In this case, the surface S4 of the second lens L2 facing the object side O may have a shape corresponding to the surface S3 of the first lens L1 facing the image side I and may be disposed in close contact therewith. The third lens L3 and the fourth lens L4 have a positive refractive power and a negative refractive power, respectively, and may be paired with each other in a similar manner to the first lens L1 and the second lens L2. The third lens L3 and the fourth lens L4 may be disposed between the paired structure of the first lens L1 and the second lens L2 and the fifth lens L5 to play an advantageous role in correcting chromatic aberration. Here, the surface S8 of the fourth lens L4 facing the object side O may have a shape corresponding to the surface S7 of the third lens L3 facing the image side I and may be disposed in close contact therewith.

In summary, there may be configured an optical system which includes a lens assembly constituted of at least four lenses (e.g., a lens assembly constituted of a total of five lenses, such as the first lens L1, the second lens L2, the third lens L3, the fourth lens L4, and the fifth lens L5 as shown in FIG. 1), as a lens assembly for implementing a telephoto lens with an field of view of 25 degrees or less, and which secures light collection performance and provides advantages in correcting chromatic aberration by forming the effective diameters of the first lens L1, which is the first one from the object side O, and the second lens L2, which is the second one from the object side O, to be relatively larger than the other lenses.

The other parameters for the first lens L1, the second lens L2, the third lens L3, the fourth lens L4, and the fifth lens L5 than the ones described above in connection with the first lens L1, the second lens L2, and the fifth lens L5 may have various settings from an embodiment to another. According to an embodiment, as shown in FIG. 1, the first lens L1 may have a surface S2 convex to the object side O and a surface S3 convex to the image side I. The surface S4 of the second lens L2 to the object side O may have a shape, i.e., a concave shape, corresponding to the surface of the first lens L1 to the image side. The surface S5 of the second lens L2 to the image side I may be concave. The surface S6 of the third lens L3 to the object side O may be convex, and the surface S7 to the image side I may be convex or flat. The surface S8 of the fourth lens L4 to the object side O may have a shape, i.e., a concave or flat shape, corresponding to the surface S7 of the third lens L3 to the image side (or having a surface that is substantially the inverse of surface S7), and the surface S9 of the fourth lens L4 to the image side I may be concave. However, this is merely an example for the first lens L1, the second lens L2, the third lens L3, the fourth lens L4, and the fifth lens L5, and it should be noted that other embodiments are also possible.

In the plurality of lenses (e.g., L1, L2, L3, L4, and L5) of the lens assembly 100, as the interval between two neighboring lenses is reduced, the optical total length (the overall length OTTL of the lens assembly along the optical axis) of the lens assembly 100 may shorten. For example, upon attempting to make a more compact electronic device including the lens assembly 100, it would be more advantageous to keep the optical total length of the lens assembly 100 as short as possible. For example, if the electronic device is a smartphone, the is lens assembly 100 may be disposed along the thickness dimension of the smartphone. However, it is desirable to keep the smartphone slim to allow for carry in pocket or purse. If an adequate telephoto ratio has been secured, reducing the overall length of the lens assembly 100 may be physically limited. The intervals between the plurality of lenses (e.g., L1, L2, L3, L4, and L5) may be varied depending on the optical properties (e.g., aberration, wide angle, and/or brightness properties) required for the lens assembly 100.

The lens assembly 100 may further include a filter F between the fifth lens L5 and the image sensor IS. The filter F may selectively block off certain light, e.g., infrared (IR) light, from detection by the image sensor in an electronic device. The filter F may include at least one of, e.g., a low pass filter or a cover glass. For example, the filter F may allow the color of an image detected and captured by the image sensor IS to be closer to the actual color which a human sees and feels for the object. The filter F may transmit visible light but reflect IR light so that IR light reaches the imaging plane img of the image sensor.

The above-described lens assembly 100 may be downsized and have high-performance optical properties by meeting the following conditional equation 1 and conditional equation 2.

$$\left|\sum \frac{f}{f_i v_d}\right| \leq 0.05 \qquad \text{[conditional equation 1]}$$

$$FOV \leq 25 \; deg \qquad \text{[conditional equation 2]}$$

In conditional equation 1, 'f' may be the focal length of each of the lenses except for the lens closest to the image side among the lenses included in the lens assembly, 'f$_t$' the focal length of the overall optical system, and 'v$_d$' the Abbe's number of each lens, and in conditional equation 2, 'FOV' may be the field of view of the overall optical system.

References will be used for lenses where LN denotes the Nth lens counted from the object side. Thus, in a lens assembly with N lenses, LN is the closest lens to the image side or image sensor IS. The lens closest to the image sensor may be the fourth lens L4 when the lens is assembly 100 includes four lenses. Or, the lens closest to the image side may be the fifth lens L5 when the lens assembly 100 includes five lenses.

In other words, conditional equation 1 may define the relationship between the focal length and the Abbe's number of each of the remaining lenses except for the lens closest to the image side. When the lens assembly 100 includes five lenses, the fifth lens L5 is the lens disposed closest to the image side I, and is less affected by chromatic aberration and but has other aberrations (astigmatism, field curvature, coma, etc.) that are relatively high, or plays a role as a kind of field flattener that decreases the sensitivity to aberration. Thus, the focal length and Abbe's number for the first to fourth lenses L1 to L4 may be targeted. As the properties of the optical system are closer to 0, the chromatic aberration decreases. When the properties of the optical system are larger than the upper limit of conditional equation 1, the chromatic aberration becomes larger than an allowable level. A high chromatic aberration results in a low-quality image. Conditional equation 2 above defines a telephoto optical system. A field of view range over 25 degrees may be disadvantageous in securing sufficient telephoto performance.

The above-described lens assembly 100 may further satisfy conditional equation 3 below.

$$vdl > 50 \qquad \text{[conditional equation 3]}$$

where:
'vdl' may be the Abbe's number of the lens closest to the image side in the lens assembly Conditional equation 3 is related to the Abbe's number of the fifth lens L5, e.g., in the lens assembly 100 including five lenses. An Abbe's number of the fifth lens in excess of 50 does not affect the optimal combination of the focal lengths and Abbe's numbers of the other lenses. An Abbe's number lower than 50 may be prone to cause chromatic aberration.

The above-described lens assembly 100 may further satisfy conditional equation 4 below.

$$0.8 < R\_L1S2/R\_L3S6 < 2 \qquad \text{[conditional equation 4]}$$

where:
R_L1S2 may be the radius of curvature of the object-side surface
S2 of the first lens L1, and
R_L3S6 may be the radius of curvature of the object-side surface S6 of the third lens L3.

The property of the optical system, being closer to 1 in conditional equation 4, may be more advantageous in correcting aberrations. When the property of the optical system exceeds the upper limit of conditional equation 4, the refractive power of the third lens L3 may be decreased, rendering it difficult to correct aberrations. When the property of the optical system is below the lower limit of conditional equation 4, the radius of curvature of the surface S3 of the first lens L1 to the image side I may be increased, making it difficult to correct aberrations.

The above-described lens assembly 100 may further satisfy conditional equation 5 below.

$$\left|\sum_{i=1}^{n} \frac{f_i}{f_t v_i}\right| \leq 0.5 \qquad \text{[conditional equation 5]}$$

where:
'f$_i$' may be the focal length of each lens included in the overall lens assembly,
'f$_t$' the focal length of the overall optical system, and
'v$_i$' the Abbe's number of each lens.

Conditional equation 5 also signifies the focal length and Abbe's number like conditional equation 1 and may be an equation for reducing or preventing chromatic aberration. For example, when the lens assembly 100 includes five lenses, conditional equation 1 considers is the focal lengths and Abbe's numbers of the other lenses (first lens L1, second lens L2, third lens L3, and fourth lens L4) than the lens (fifth lens L5) closest to the image side I while conditional equation 5 may consider the focal lengths and Abbe's numbers of all of the lenses (first lens L1, second lens L2, third lens L3, fourth lens L4, and fifth lens L5) constituting the lens assembly 100. When the properties of the optical system are larger than the upper limit of conditional equation 5, the chromatic aberration becomes larger than an allowable level, so that a low-quality image may be output.

Table 1 below shows various data about the lens assembly 100, wherein 'S2 to S11' may denote the object-side (O) and image-side (I) surfaces of a plurality of relevant lenses (e.g., L1, L2, L3, L4, and L5). 'S1' is not an actual lens surface, but a position considered in view of design of the lens assembly 400, e.g., a reference position of a structure in which a protection window is disposed or the position of a structure (or lens barrel or lens housing) for fixing any one (e.g., first lens L1) among the lenses (L1, L2, L3, L4, and L5). S2 is the object-side (O) surface of the first lens L1 of the lens assembly 100 and may be the same as the position of the diaphragm sto. 'S12' and 'S13' may mean the object-side (O) surface and image-side (I) surface of an IR cut filter F. 'obj' may mean the object. radius may mean the radius of curvature of the lens, thickness the thickness of the lens or air gap, efl the focal length of the lens, nd the refractive index of the medium (e.g., lens), and v$_d$ the Abbe's number of the lens. The lens assembly 100 included in Table 1 below may satisfy the above-described conditions (and/or at least one of the above-described conditions) when the F-number (Fno) is about 2.602, the angle of view (ANG) is about 20.09 degrees, and the combined focal length (efl) is about 14.2 mm, while the optical total length (OTTL) is 13.500 mm, and the image height (ImgH) of the image sensor IS is 2.55.

TABLE 1

| surface obj | radius infinity | thickness infinity | efl | nd | V$_d$ |
|---|---|---|---|---|---|
| S1 | infinity | 0.00000 | | | |
| S2(sto) | 3.79522 | 2.06784 | 5.395 | 1.53430 | 55.66 |
| S3 | −9.88335 | 0.03500 | | | |
| S4 | −18.04684 | 1.34922 | −4.149 | 1.61500 | 25.96 |

TABLE 1-continued

| surface obj | radius infinity | thickness infinity | efl | nd | $V_d$ |
|---|---|---|---|---|---|
| S5 | 3.08932 | 0.90146 | | | |
| S6 | 3.49349 | 0.74885 | 6.303 | 1.66074 | 20.38 |
| S7 | 18.70658 | 0.05254 | | | |
| S8 | 17.29085 | 0.35000 | −6.697 | 1.61500 | 25.96 |
| S9 | 3.32486 | 0.59812 | | | |
| S10 | 3.89352 | 0.54105 | 21.944 | 1.54410 | 56.11 |
| S11 | 5.48225 | 0.64795 | | | |
| S12 | infinity | 0.21000 | infinity | 1.51680 | 64.17 |
| S13 | infinity | 6.00842 | | | |
| img | infinity | −0.01050 | | | |

Tables 2 and 3 below show the aspheric coefficients of the plurality of lenses (e.g., L1, L2, L3, L4, and L5), which may be calculated by conditional equation 6 as follows:

$$x = \frac{cy^2}{1 + \sqrt{1 - (K+1)c^2 y^2}} + \text{[conditional equation 6]}$$
$$Ay^4 + By^6 + Cy^8 + Dy^{10} + \dots$$

Here, 'x' may mean the distance sag from the vertex of the lens to the optical axis O-I, 'c' the reciprocal of the default radius of curvature of the lens, 'y' the distance in the direction perpendicular to the optical axis, 'K' the Conic constant, and 'A,' 'B,' 'C,' 'D,' 'E,' 'F,' 'G,' 'H,' and 'J' the aspheric coefficients.

TABLE 2

| | S2 | S3 | S4 | S5 | S6 |
|---|---|---|---|---|---|
| Radius | 3.79522E+00 | −9.88335E+00 | −1.80468E+01 | 3.08932E+00 | 3.49349E+00 |
| K | −3.31908E−01 | −1.50289E+01 | −6.36126E+01 | 1.25536E−01 | 1.25998E−01 |
| A($4^{th}$) | 9.50431E−04 | 1.26269E−03 | −5.48291E−03 | −1.33783E−02 | −7.40305E−03 |
| B($6^{th}$) | −2.87964E−04 | 9.56476E−04 | 2.68202E−03 | 4.02108E−03 | 6.96642E−03 |
| C($8^{th}$) | 2.85881E−04 | 6.73163E−04 | 4.49091E−06 | −1.69133E−03 | −3.94375E−03 |
| D($10^{th}$) | −1.42143E−04 | −9.95678E−04 | −7.48744E−04 | −9.86635E−05 | 5.23922E−04 |
| E($12^{th}$) | 4.50661E−05 | 5.03930E−04 | 4.46604E−04 | 6.76683E−04 | 7.78602E−04 |
| F($14^{th}$) | −8.96059E−06 | −1.36746E−04 | −1.29929E−04 | −4 04994E−04 | −4.93107E−04 |
| G($16^{th}$) | 1.07912E−06 | 2.11917E−05 | 2.10407E−05 | 1.16758E−04 | 1.14401E−04 |
| H($18^{th}$) | −7.14904E−08 | −1.77351E−06 | −1.82019E−06 | −1.71057E−05 | −8.81054E−06 |
| J($20^{th}$) | 1.97608E−09 | 6.23537E−08 | 6.58279E−08 | 1.02994E−06 | −1.72516E−07 |

TABLE 3

| | S7 | S8 | S9 | S10 | S11 |
|---|---|---|---|---|---|
| Radius | 1.87066E+01 | 1.72908E+01 | 3.32486E+00 | 3.89352E+00 | 5.48225E+00 |
| K | −9.90000E+01 | 5.02765E+00 | 1.37508E+00 | −3.87721E+00 | −1.84733E+01 |
| A($4^{th}$) | −1.79892E−02 | −3.85623E−03 | 4.23815E−03 | −1.91468E−02 | −7.77460E−03 |
| B($6^{th}$) | 7.26293E−02 | 6.11797E−02 | −9.34914E−03 | −3.83671E−03 | −5.67060E−03 |
| C($8^{th}$) | −1.04920E−01 | −9.88550E−02 | 1.86447E−02 | 1.89518E−02 | 1.10060E−02 |
| D($10^{th}$) | 8.85217E−02 | 8.60670E−02 | −1.99232E−02 | −2.12925E−02 | −1.24733E−02 |
| E($12^{th}$) | −4.65188E−02 | −4.52516E−02 | 1.42999E−02 | 1.46553E−02 | 9.85565E−03 |
| F($14^{th}$) | 1.52560E−02 | 1.43132E−02 | −7.04960E−03 | −6.44121E−03 | −5.43014E−03 |
| G($16^{th}$) | −3.02017E−03 | −2.53012E−03 | 2.48041E−03 | 1.86878E−03 | 2.02872E−03 |
| H($18^{th}$) | 3.28592E−04 | 1.97812E−04 | −5.67392E−04 | −3.33010E−04 | −4.50491E−04 |
| J($20^{th}$) | −1.50070E−05 | −1.41275E−06 | 6.03416E−05 | 2.76324E−05 | 4.42031E−05 |

Figure 2:
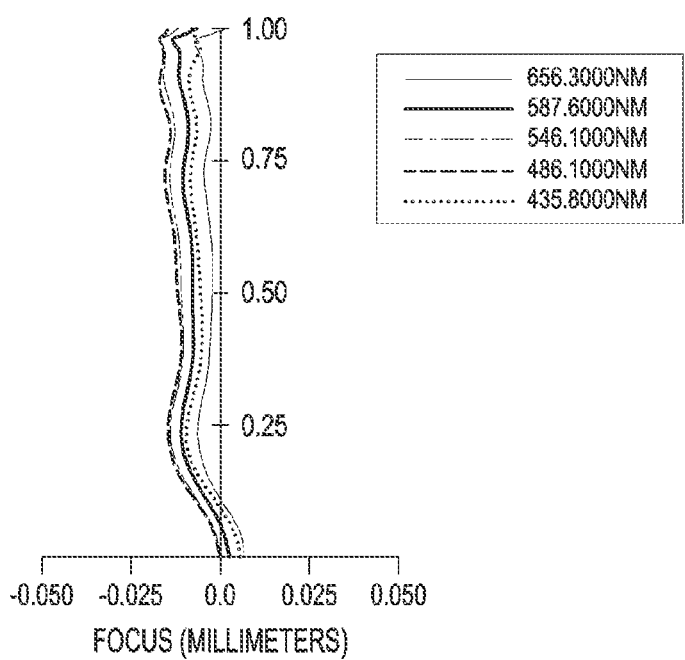
FIG. 2 is a graph illustrating the spherical aberration of a lens assembly according to the embodiment of FIG. 1.

FIG. 2 is a graph illustrating the spherical aberration of the lens assembly 100 according to the embodiment of FIG. 1. Spherical aberration may refer light beams passing through different portions (e.g., the chief portion and the marginal portion) of the lens, thereby becoming focused on different positions.

Figures 3, 4:
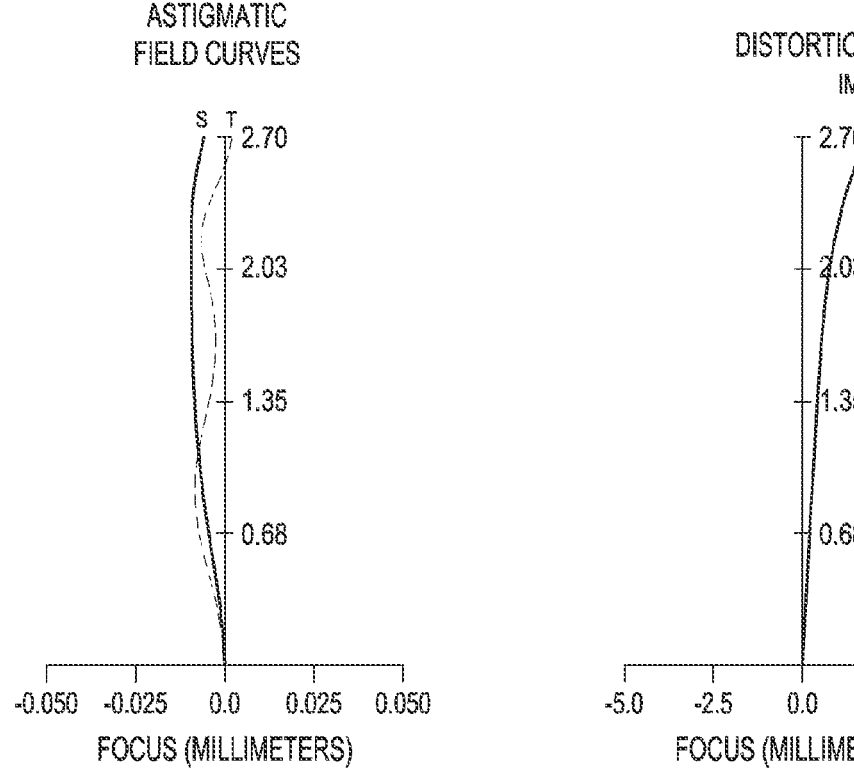
FIG. 3 is a graph illustrating the astigmatism of a lens assembly according to the embodiment of FIG. 1.
FIG. 4 is a graph illustrating the distortion of a lens assembly according to the embodiment of FIG. 1.

In FIG. 2, the horizontal axis refers to the degree of longitudinal spherical aberration, and the vertical axis refers to the result of normalization of the distance from the center of the optical axis. FIG. 2 may illustrate variations in longitudinal spherical aberration depending on light wavelengths. The longitudinal spherical aberration may be shown for light with wavelengths of about 656.3000 nanometers (nm), about 587.6000 nm, about 546.1000 nm, about 486.1000 nm, and about 435.8000 nm. Referring to FIG. 3, in a visible light range, the longitudinal spherical aberration of the lens assembly, according to an embodiment, may be limited to be within a range from about +0.025 to −0.025 so that stable optical properties are shown.

FIG. 3 is a graph illustrating the astigmatism of the lens assembly 100 according to the embodiment of FIG. 1an. Astigmatism may refer to a deviation between the focuses of the light beams passing in the vertical and horizontal directions when the tangential plane or meridian plane of the lens has a different radius from the radius of the sagittal plane of the lens.

FIG. 3 shows the results of astigmatism of the lens assembly 100 with light having a wavelength of about 546.1000 nm, wherein the dashed line T may denote the astigmatism in the tangential direction (e.g., tangential field curvature), and a solid line S may denote the astigmatism in the sagittal direction (e.g., sagittal field curvature). It can be identified from FIG. 3 that the astigmatism may be limited to a range from about +0.025 to −0.025 so that stable optical properties may be shown according to an embodiment of the disclosure.

FIG. 4 is a graph illustrating the distortion of the lens assembly 100 according to the embodiment of FIG. 1. Distortion occurs because the optical magnification varies depending on the distance from the optical axis O-I. As compared with an image forming on a theoretical imaging plane, an image forming on the actual imaging plane (e.g., img of FIG. 1) may be shown to be larger or smaller by distortion.

FIG. 4 shows the results of distortion of the lens assembly 100, which are obtained in a wavelength of about 546.1000 nm. The image captured by the lens assembly 100 may cause distortion at a point (e.g., marginal portion) off the optical axis O-I. However, the distortion is a degree that may commonly occur in an optical device using a lens, and the lens assembly 100 according to one of an embodiment of the disclosure (e.g., the embodiment of FIG. 1) has a distortion rate of less than about 2.5% and may provide good optical properties.

Figure 5:
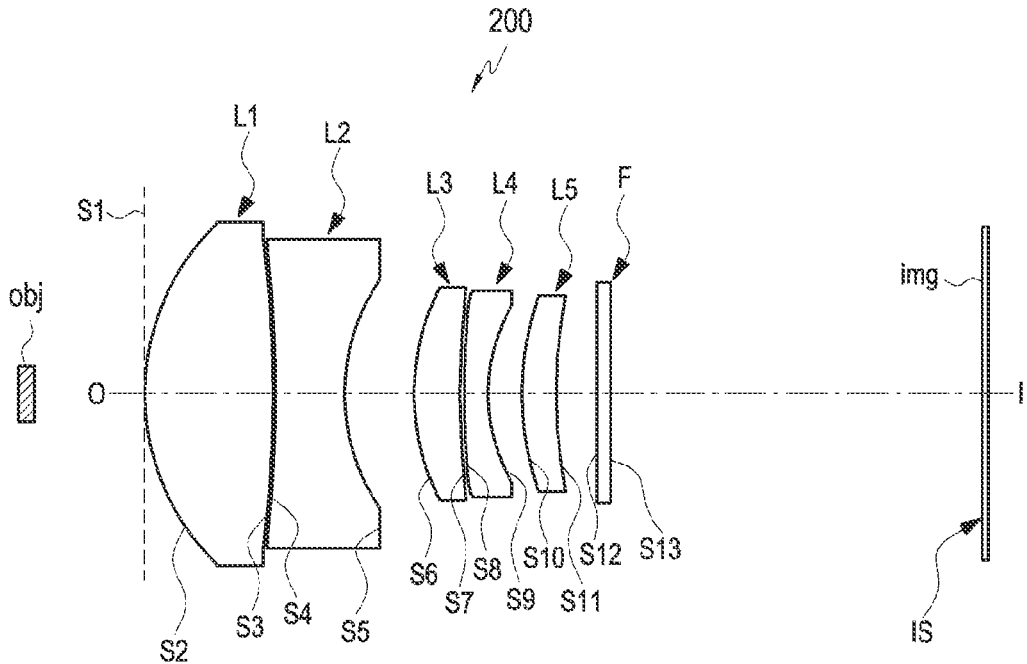
FIG. 5 is a view illustrating a configuration of an optical system including an image sensor and a lens assembly according to an embodiment.
Figure 6:
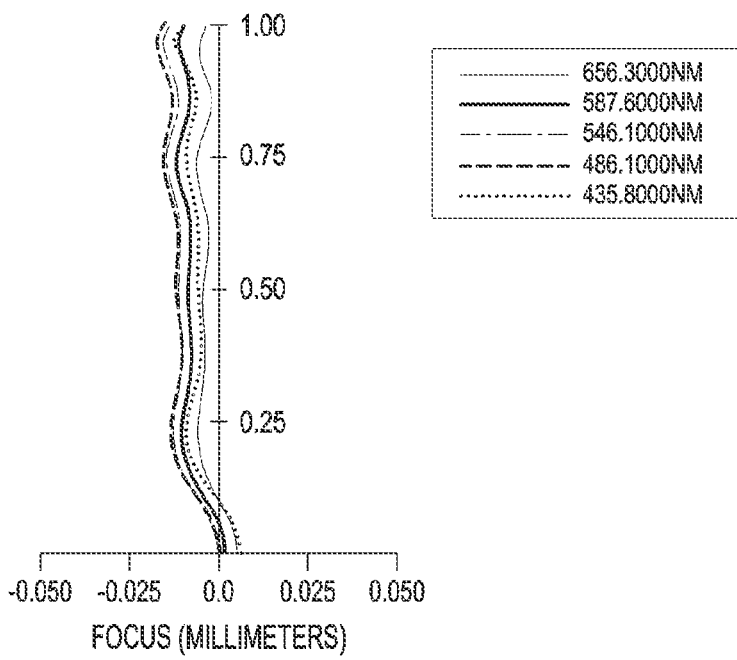
FIG. 6 is a graph illustrating the spherical aberration of a lens assembly according to the embodiment of FIG. 5.
Figure 7:
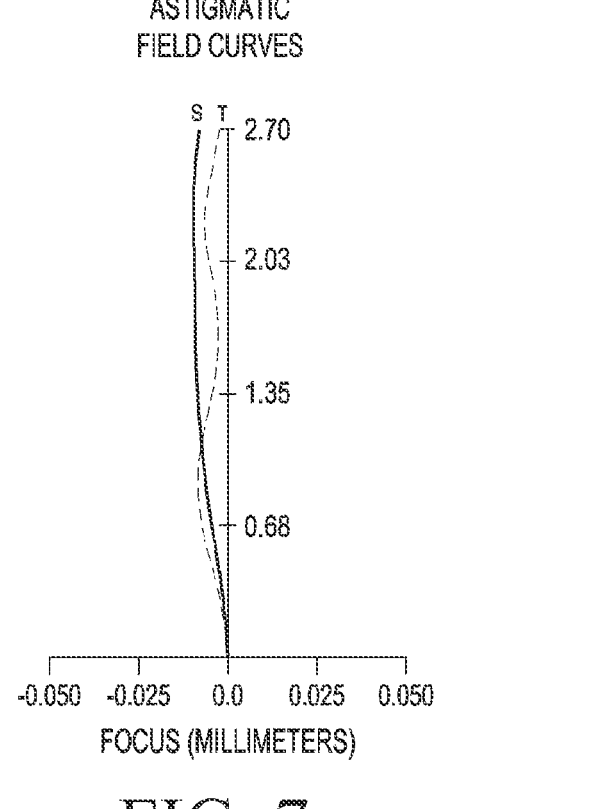
FIG. 7 is a graph illustrating the astigmatism of a lens assembly according to the embodiment of FIG. 5.
Figure 8:
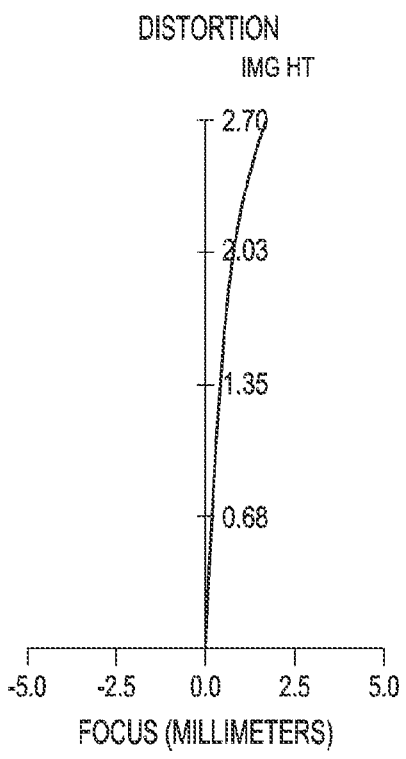
FIG. 8 is a graph illustrating the distortion of a lens assembly according to the embodiment of FIG. 5.

FIG. 5 is a view illustrating a configuration of a lens assembly 200 according to an embodiment of the disclosure. FIG. 6 is a graph illustrating the spherical aberration of a lens assembly 200 according to the embodiment of FIG. 5. FIG. 7 is a graph illustrating the astigmatism of a lens assembly 200 according to the embodiment of FIG. 5. FIG. 8 is a graph illustrating the distortion of a lens assembly 200 according to the embodiment of FIG. 5.

The description of the lens assembly 100 according to the foregoing embodiments may apply to lens assemblies 200, 300, 400, 500, and 600 described below according to other an embodiment. Some of the plurality of lens assemblies 100, 200, 300, 400, 500, and 600 may have the same lens attribute (e.g., view angle, focal length, auto-focusing, f number (Fno), or optical zoom), or at least one lens assembly may have one or more lens attributes different from those of another lens assembly.

The plurality of lens assemblies 100, 200, 300, 400, 500, and 600 may include flash (2320 of FIG. 23 as described below), image sensors IS, image stabilizers (2340 of FIG. 23 as described below), memories (2350 of FIG. 23 as described below), or image signal processors (2360 of FIG. 23 as described below), thereby constituting optical devices (e.g., camera modules).

In describing the following embodiments of the disclosure, the same or similar, or no reference characters are given for components which may readily be appreciated from the above-described embodiments. Detailed description thereof is omitted below where there is overlap with the above description.

Referring to FIGS. 5 to 8, a lens assembly 200 may include a plurality of lenses (e.g., L1, L2, L3, L4, and L5), an image sensor IS, and/or a filter F.

Table 4 below may represent various lens data about the lens assembly 200 according to the embodiment of FIG. 5. Tables 5 and 6 below may show the aspheric coefficients of the plurality of lenses (e.g., L1, L2, L3, L4, and L5). Here, the lens assembly 200 may have a F-number (Fno) of about 2.716, a field of view (ANG) of about 20.09 degrees, a focal length of about 2.55 mm, an optical total length (OTTL) of about 13.500 mm, and an image height of 2.55 mm and may satisfy the above-described conditions (and/or at least one of the above-described conditions).

TABLE 4

| surface obj | radius infinity | thickness infinity | efl | nd | $V_d$ |
|---|---|---|---|---|---|
| S1 | infinity | 0.00000 | | | |
| S2(sto) | 3.71431 | 2.12618 | 5.217 | 1.53430 | 55.66 |
| S3 | −9.09138 | 0.03000 | | | |
| S4 | −15.85768 | 1.01559 | −4.054 | 1.61500 | 25.96 |
| S5 | 3.06375 | 0.91636 | | | |
| S6 | 3.54669 | 0.74707 | 6.319 | 1.66074 | 20.38 |
| S7 | 20.26586 | 0.03266 | | | |
| S8 | 16.84015 | 0.60935 | −6.780 | 1.61500 | 25.96 |
| S9 | 3.31996 | 0.62896 | | | |
| S10 | 3.94272 | 0.46828 | 23.542 | 1.54410 | 56.11 |
| S11 | 5.44622 | 0.64795 | | | |
| S12 | infinity | 0.21000 | infinity | 1.51680 | 64.17 |
| S13 | infinity | 6.07811 | | | |
| img | infinity | −0.01050 | | | |

TABLE 5

| | S2 | S3 | S4 | S5 | S6 |
|---|---|---|---|---|---|
| Radius | 3.71431E+00 | −9.09138E+00 | −1.58577E+01 | 3.06375E+00 | 3.54669E+00 |
| K | −3.44590E−01 | 1.56104E+01 | 5.87866E+01 | 1.27564E−01 | 1.17469E−01 |
| A($4^{th}$) | 8.56597E−04 | 2.32779E−03 | −5.51200E−03 | −1.31898E−02 | −7.44777E−03 |
| B($6^{th}$) | −2.47306E−04 | −1.26295E−03 | 1.62697E−03 | 5.64584E−03 | 6.08955E−03 |
| C($8^{th}$) | 2.30968E−04 | 3.14240E−03 | 1.62977E−03 | −3.99304E−03 | −1.47341E−03 |
| D($10^{th}$) | −1.01910E−04 | −2.52241E−03 | −1.90893E−03 | 1.74678E−03 | −2.57790E−03 |
| E($12^{th}$) | 2.91480E−05 | 1.05782E−03 | 9.09555E−04 | −4.00583E−04 | 2.92181E−03 |
| F($14^{th}$) | −5.29263E−06 | −2.56348E−04 | −2.37290E−04 | 5.18016E−05 | −1.39299E−03 |
| G($16^{th}$) | 5.84530E−07 | 3.61280E−05 | 3.52452E−05 | −1.09246E−05 | 3.49749E−04 |
| H($18^{th}$) | −3.52743E−08 | −2.75254E−06 | −2.79804E−06 | 3.23276E−06 | −4.48889E−05 |
| J($20^{th}$) | 8.59739E−10 | 8.76647E−08 | 9.22126E−08 | −3.50675E−07 | 2.35157E−06 |

TABLE 6

| | S7 | S8 | S9 | S10 | S11 |
|---|---|---|---|---|---|
| Radius | 2.02659E+01 | 1.68402E+01 | 3.31996E+00 | 3.94272E+00 | 5.44622E+00 |
| K | −9.90000E+01 | 5.25229E+00 | 1.37475E+00 | −4.09100E+00 | −1.98191E+01 |
| A($4^{th}$) | −1.75764E−02 | −3.73906E−03 | 4.60018E−03 | −2.00978E−02 | −9.07675E−03 |
| B($6^{th}$) | 6.99433E−02 | 6.09208E−02 | −5.55457E−03 | 1.29379E−03 | −3.27527E−03 |
| C($8^{th}$) | −9.93915E−02 | −1.00323E−01 | 2.84793E−03 | 4.73911E−03 | 5.25036E−03 |
| D($10^{th}$) | 8.22036E−02 | 8.93903E−02 | 4.65863E−03 | −4.52917E−03 | −7.15009E−03 |
| E($12^{th}$) | −4.19979E−02 | −4.80065E−02 | −6.32611E−03 | 4.28041E−03 | 8.42406E−03 |
| F($14^{th}$) | 1.31101E−02 | 1.54151E−02 | 3.17130E−03 | −3.02754E−03 | −6.35746E−03 |

TABLE 6-continued

|  | S7 | S8 | S9 | S10 | S11 |
|---|---|---|---|---|---|
| G(16th) | −2.35052E−03 | −2.73071E−03 | −4.79393E−04 | 1.44063E−03 | 2.88408E−03 |
| H(18th) | 2.04061E−04 | 2.05308E−04 | −1.12814E−04 | −3.79771E−04 | −7.07081E−04 |
| J(20th) | −4.61978E−06 | 1.21373E−08 | 3.21838E−05 | 4.10336E−05 | 7.21435E−05 |

Figure 9:
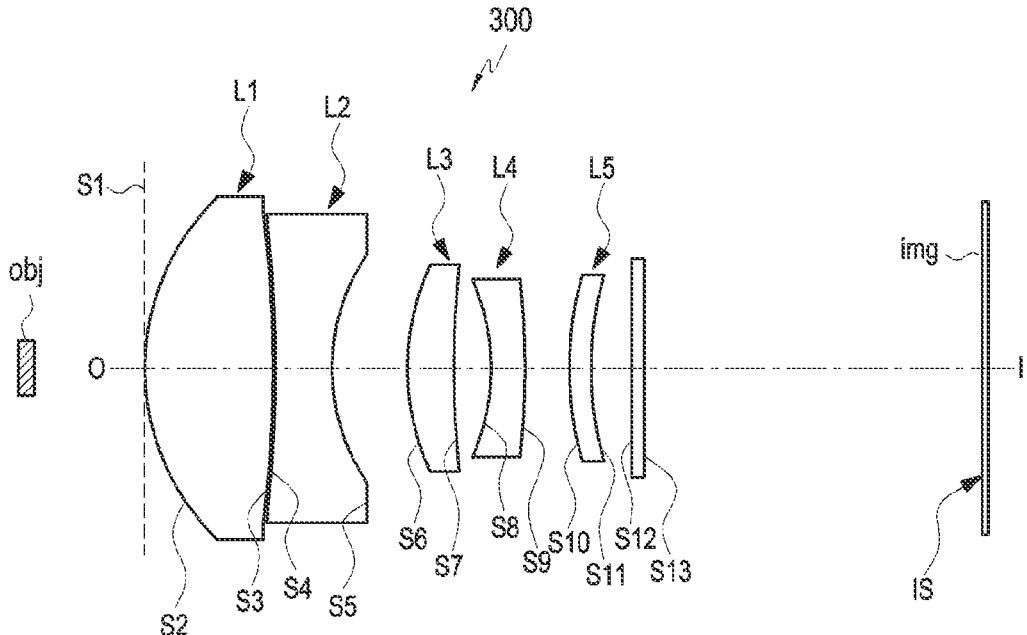
FIG. 9 is a view illustrating a configuration of an optical system including an image sensor and a lens assembly according to an embodiment.
Figure 10:
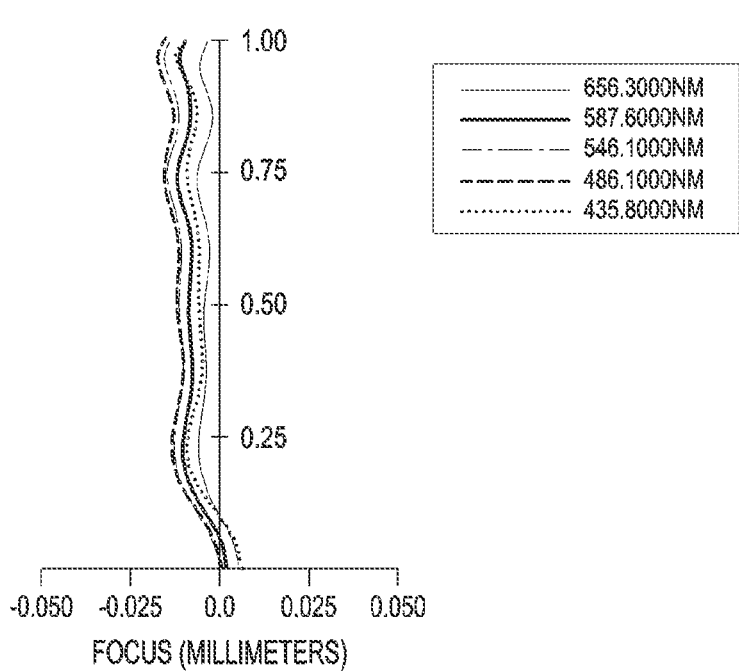
FIG. 10 is a graph illustrating the spherical aberration of a lens assembly according to the embodiment of FIG. 9.

FIG. 9 is a view illustrating a configuration of a lens assembly 300 according to an embodiment of the disclosure. FIG. 10 is a graph illustrating the spherical aberration of a lens assembly 300 according to the embodiment of FIG. 9. FIG. 11 is a graph illustrating the astigmatism of a lens assembly 300 according to the embodiment of FIG. 9. FIG. 12 is a graph illustrating the distortion of a lens assembly 300 according to the embodiment of FIG. 9.

Referring to FIGS. 9 to 12, according to an embodiment of the disclosure, a lens assembly 300 may include a plurality of lenses (e.g., L1, L2, L3, L4, and L5), an image sensor IS, and/or a filter F.

Table 7 below may represent various lens data about the lens assembly 300 and Tables 8 and 9 below may show the respective aspheric coefficients of the plurality of lenses (L1, L2, L3, L4, and L5). Here, the lens assembly 300 may have a F-number (F-no) of about 2.616, a field of view (ANG) of about 20.09 degrees, a focal length of about 14.2 mm, an optical total length of about 13.500 mm, and an image height of 2.55 mm and may satisfy the above-described conditions (and/or at least one of the above-described conditions).

TABLE 7

| Surface | radius | thickness | efl | nd | vd |
|---|---|---|---|---|---|
| obj | infinity | infinity |  |  |  |
| s1 | infinity | 0.00000 |  |  |  |
| S2(sto) | 3.61886 | 2.16619 | 5.191 | 1.53430 | 55.66 |
| s3 | −9.56341 | 0.04259 |  |  |  |
| s4 | −14.11042 | 0.89730 | −4.431 | 1.61500 | 25.96 |
| s5 | 3.49856 | 1.18324 |  |  |  |
| s6 | 3.95247 | 0.73274 | 7.969 | 1.66074 | 20.38 |
| s7 | 14.18852 | 0.60781 |  |  |  |
| s8 | −3.98294 | 0.53838 | −9.338 | 1.61500 | 25.96 |
| s9 | −13.39472 | 0.72778 |  |  |  |
| s10 | 4.60355 | 0.35510 | 53.549 | 1.54410 | 56.11 |
| s11 | 5.31399 | 0.64795 |  |  |  |
| s12 | infinity | 0.21000 | infinity | 1.51680 | 64.17 |
| s13 | infinity | 5.40140 |  |  |  |
| img | infinity | −0.01050 |  |  |  |

TABLE 8

|  | S2 | S3 | S4 | S5 | S6 |
|---|---|---|---|---|---|
| Radius | 3.61886E+00 | −9.56341E+00 | −1.41104E+01 | 3.49856E+00 | 3.95247E+00 |
| K | −3.63789E−01 | −1.54018E+01 | −5.37580E+01 | 5.18160E−02 | 4.68521E−01 |
| A(4th) | 5.74962E−04 | 5.81217E−04 | −5.67908E−03 | −1.01210E−02 | −1.18459E−03 |
| B(6th) | −7.71112E−05 | 2.48140E−03 | 1.88209E−03 | −4.39898E−03 | −7.69616E−03 |
| C(8th) | 1.89824E−04 | −2.01745E−04 | 1.30036E−03 | 6.78438E−03 | 1.42701E−02 |
| D(10th) | −1.11441E−04 | −7.77015E−04 | −1.62640E−03 | −5.10418E−03 | −1.43196E−02 |
| E(12th) | 3.75500E−05 | 4.90438E−04 | 7.82531E−04 | 2.49946E−03 | 9.30909E−03 |
| F(14th) | −7.55355E−06 | −1.43063E−04 | −2.08304E−04 | −8.08830E−04 | −3.94881E−03 |
| G(16th) | 8.96062E−07 | 2.29295E−05 | 3.21170E−05 | 1.66722E−04 | 1.05261E−03 |
| H(18th) | −5.72860E−08 | −1.95587E−06 | −2.69267E−06 | −1.97086E−05 | −1.58284E−04 |
| J(20th) | 1.48270E−09 | 6.96054E−08 | 9.52194E−08 | 1.01234E−06 | 1.01138E−05 |

TABLE 9

|  | S7 | S8 | S9 | S10 | S11 |
|---|---|---|---|---|---|
| Radius | 1.41885E+01 | 3.98294E+00 | 1.33947E+01 | 4.60355E+00 | 5.31399E+00 |
| K | −9.08769E+01 | 8.49337E−01 | −9.85435E+01 | −6.13374E+00 | −1.31313E+01 |
| A(4th) | 2.84010E−03 | −7.88655E−03 | −1.95601E−02 | −2.73216E−02 | −1.40685E−02 |
| B(6th) | −7.62465E−03 | 1.75430E−02 | 3.37148E−02 | 3.23110E−02 | 2.27150E−02 |
| C(8th) | 2.48897E−02 | −5.60816E−03 | −4.87012E−02 | −5.29525E−02 | −4.33473E−02 |
| D(10th) | −3.46490E−02 | −2.29259E−02 | 4.69456E−02 | 5.58509E−02 | 4.96053E−02 |
| E(12th) | 2.84562E−02 | 3.45984E−02 | −3.29557E−02 | −3.73562E−02 | −3.53690E−02 |
| F(14th) | −1.49180E−02 | −2.39871E−02 | 1.71505E−02 | 1.63855E−02 | 1.62468E−02 |
| G(16th) | 4.89237E−03 | 9.40477E−03 | −6.00655E−03 | −4 44609E−03 | −4.56283E−03 |
| H(18th) | −9.09609E−04 | −2.01558E−03 | 1.22184E−03 | 6.56348E−04 | 6.95766E−04 |
| J(20th) | 7.24693E−05 | 1.83743E−04 | −1.07106E−04 | −3.83883E−05 | −4.23914E−05 |

Figure 13:
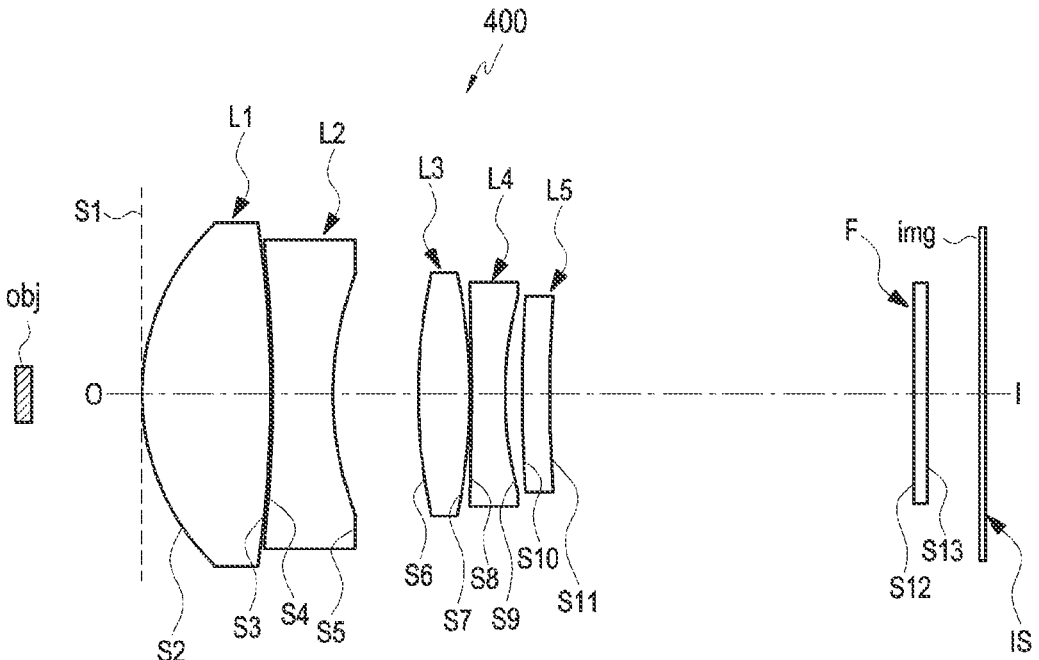
FIG. 13 is a view illustrating a configuration of an optical system including an image sensor and a lens assembly according to an embodiment.
Figure 14:
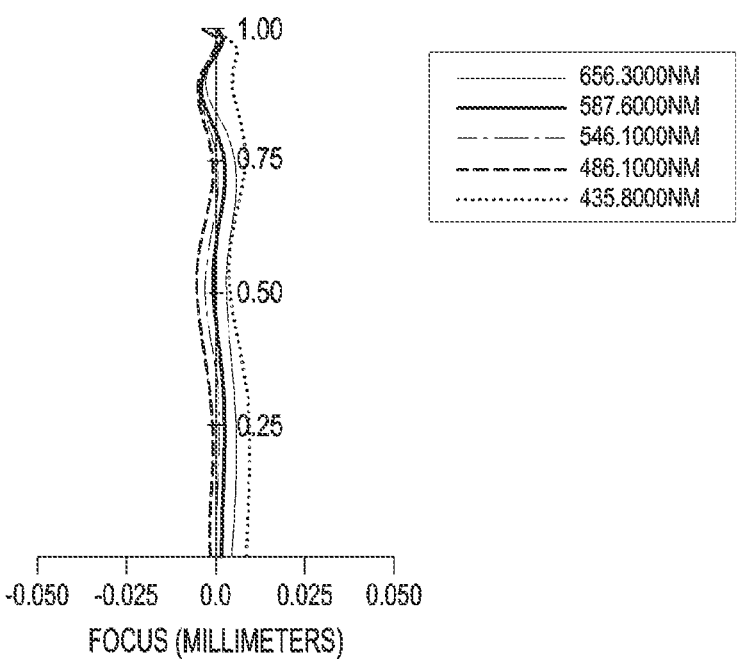
FIG. 14 is a graph illustrating the spherical aberration of a lens assembly according to the embodiment of FIG. 13.

FIG. 13 is a view illustrating a configuration of a lens assembly 400 according to an embodiment of the disclosure. FIG. 14 is a graph illustrating the spherical aberration of a lens assembly 400 according to the embodiment of FIG. 13. FIG. 14 is a graph illustrating the astigmatism of a lens assembly 400 according to the embodiment of FIG. 13. FIG. 15 is a graph illustrating the distortion of a lens assembly 400 according to the embodiment of FIG. 13.

Referring to FIGS. 13 to 16, according to an embodiment of the disclosure, a lens assembly 400 may include a plurality of lenses (e.g., L1, L2, L3, L4, and L5), an image sensor IS, and/or a filter F.

Table 10 below may represent various lens data about the lens assembly 400 and Table 11 below may show the respective aspheric coefficients of the plurality of lenses (L1, L2, L3, L4, and L5). Here, the lens assembly 400 may have a F-number (F-no) of about 4.413, a field of view (ANG) of about 10.21 degrees, a focal length of about 30.89 mm, an optical total length of about 26.500 mm, and an image height of 2.782 mm and may satisfy the above-described conditions (and/or at least one of the above-described conditions).

FIGS. 13 to 15 may show an embodiment of a lens assembly with lenses in which spherical surfaces and aspherical surfaces are mixed. For example, referring to Table 11, in the lens assembly 400, lens surfaces S2, S3, S5, S6, and S8 may be formed as aspherical surfaces, and the other lens surfaces may be formed as spherical surfaces.

Figure 17:
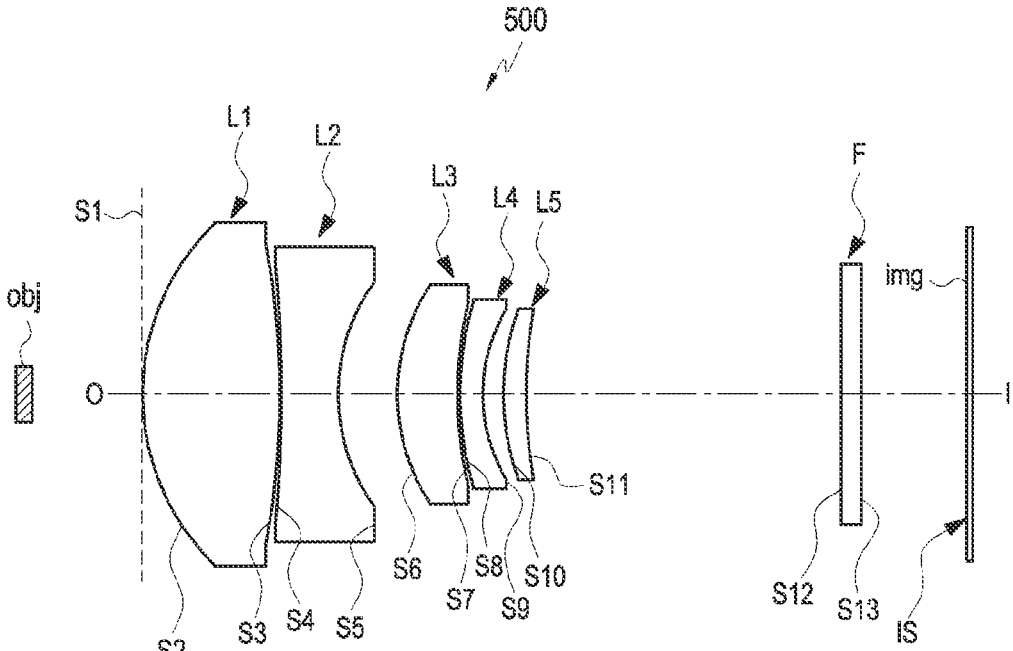
FIG. 17 is a view illustrating a configuration of a lens assembly according to an embodiment of the disclosure.
Figure 18:
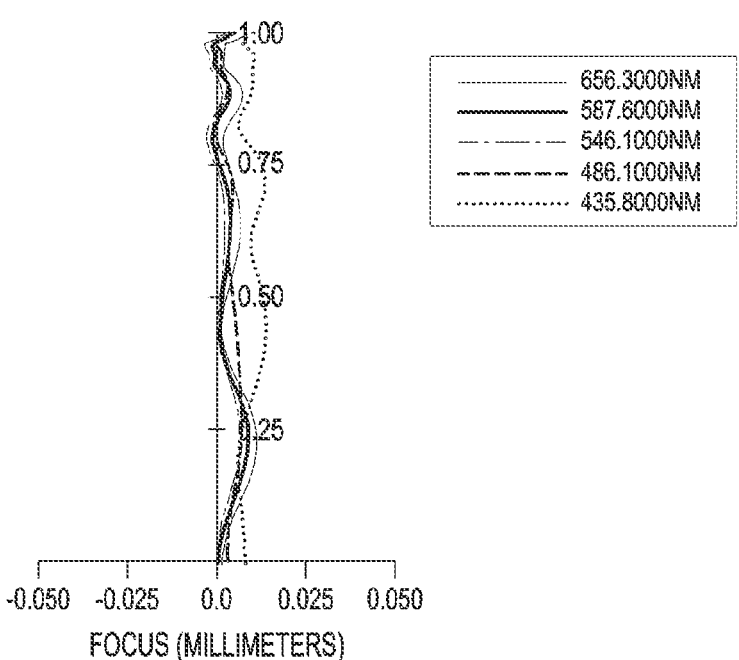
FIG. 18 is a graph illustrating the spherical aberration of a lens assembly according to the embodiment of FIG. 17.
Figure 19:
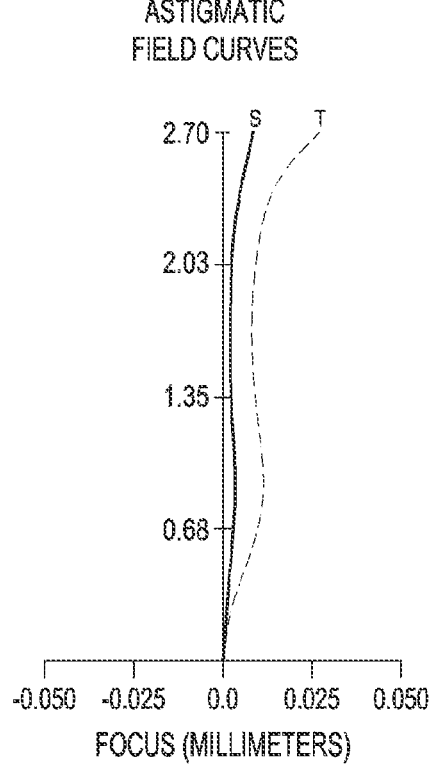
FIG. 19 is a graph illustrating the astigmatism of a lens assembly according to the embodiment of FIG. 17.
Figure 20:
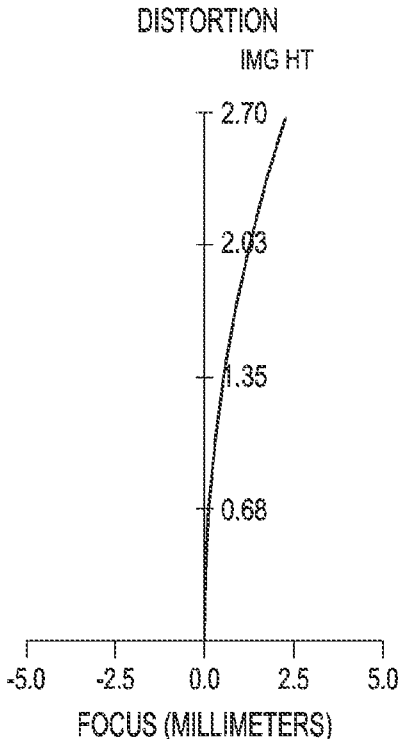
FIG. 20 is a graph illustrating the distortion of a lens assembly according to the embodiment of FIG. 17.

FIG. 17 is a view illustrating a configuration of a lens assembly 500 according to an embodiment of the disclosure. FIG. 18 is a graph illustrating the spherical aberration of a lens assembly 500 according to the embodiment of FIG. 17. FIG. 19 is a graph illustrating the astigmatism of a lens assembly 500 according to the embodiment of FIG. 17. FIG. 20 is a graph illustrating the distortion of a lens assembly 500 according to the embodiment of FIG. 17.

Referring to FIGS. 17 to 20, a lens assembly 500 may include a plurality of lenses (e.g., L1, L2, L3, L4, and L5), an image sensor IS, and/or a filter F.

Table 12 below may represent various lens data about the lens assembly 500 and Tables 13 and 14 below may show the respective aspheric coefficients of the plurality of lenses (L1, L2, L3, L4, and L5). Here, the lens assembly 500 may have a F-number (Fno) of about 2.582, a field of view (ANG) of about 19.61 degrees, a combined focal length of about 14.02 mm, an optical total length of about 13.487 mm, and an image height of 2.5 mm and may satisfy the above-described conditions (and/or at least one of the above-described conditions).

TABLE 10

| surface obj | radius infinity | thickness infinity | efl | nd | $V_d$ |
|---|---|---|---|---|---|
| S1 | infinity | 0.00000 | | | |
| S2(sto) | 6.44592 | 2.30000 | 8.495 | 1.53480 | 55.71 |
| S3 | −13.67105 | 0.05000 | | | |
| S4 | −17.96372 | 1.33000 | −9.305 | 1.61444 | 25.94 |
| S5 | 8.73882 | 1.54683 | | | |
| S6 | 8.95973 | 1.66330 | 6.949 | 1.65037 | 21.52 |
| S7 | −8.63437 | 0.05000 | | | |
| S8 | −12.47622 | 0.87448 | −7.454 | 1.63492 | 23.89 |
| S9 | 7.95799 | 0.38516 | | | |
| S10 | 55.76673 | 0.80000 | −24.721 | 1.54410 | 56.09 |
| S11 | 10.82033 | 15.89157 | | | |
| S12 | infinity | 0.11000 | infinity | 1.51680 | 64.17 |
| S13 | infinity | 0.99999 | | | |
| img | infinity | −0.00134 | | | |

TABLE 12

| Surface Obj | radius infinity | thickness infinity | efl | nd | $V_d$ |
|---|---|---|---|---|---|
| S1 | infinity | 0.00000 | | | |
| S2(sto) | 3.66858 | 2.20653 | 5.056 | 1.53430 | 55.66 |
| S3 | −8.22705 | 0.03500 | | | |
| S4 | −15.92542 | 0.80048 | −3.936 | 1.61500 | 25.96 |
| S5 | 2.94110 | 1.01564 | | | |
| S6 | 3.49978 | 1.01640 | 6.450 | 1.67074 | 19.24 |
| S7 | 15.39018 | 0.05841 | | | |
| S8 | 15.92261 | 0.30000 | −5.954 | 1.61500 | 25.96 |
| S9 | 2.97727 | 0.35855 | | | |
| S10 | 3.29039 | 0.36911 | 14.687 | 1.54410 | 56.11 |
| S11 | 5.35523 | 7.18566 | | | |
| S12 | infinity | 0.11000 | infinity | 1.51680 | 64.17 |
| S13 | infinity | 0.02793 | | | |
| Img | infinity | 0.00300 | | | |

TABLE 11

| | S2 | S3 | S5 | S6 | S8 |
|---|---|---|---|---|---|
| Radius | 6.44592E+00 | −1.36711E+01 | 8.73882E+00 | 8.95973E+00 | −1.24762E+01 |
| K | −3.11592E−01 | 0.00000E+00 | 0.00000E+00 | −7.86929E−02 | 4.59917E+00 |
| $A(4^{th})$ | 2.09523E−04 | 6.00281E−04 | −1.70836E−04 | −4.24626E−04 | −7.45297E−04 |
| $B(6^{th})$ | 8.98368E−06 | 6.79892E−06 | −2.94918E−06 | 1.27506E−05 | −2.24976E−05 |
| $C(8^{th})$ | 6.24268E−07 | −9.17252E−07 | −6.73134E−07 | −1.08376E−05 | 1.08346E−05 |
| $D(10^{th})$ | −2.85608E−08 | 1.88606E−08 | 3.87747E−07 | 9.54475E−07 | −5.77655E−07 |
| $E(12^{th})$ | 3.61079E−09 | −8.32697E−10 | 0.00000E+00 | −1.40213E−08 | −6.90428E−08 |
| $F(14^{th})$ | −1.25292E−10 | 0.00000E+00 | 0.00000E+00 | 0.00000E+00 | 5.43215E−09 |
| $G(16^{th})$ | 0.00000E+00 | 0.00000E+00 | 0.00000E+00 | 0.00000E+00 | 0.00000E+00 |
| $H(18^{th})$ | 0.00000E+00 | 0.00000E+00 | 0.00000E+00 | 0.00000E+00 | 0.00000E+00 |
| $J(20^{th})$ | 0.00000E+00 | 0.00000E+00 | 0.00000E+00 | 0.00000E+00 | 0.00000E+00 |

TABLE 13

|  | S2 | S3 | S4 | S5 | S6 |
|---|---|---|---|---|---|
| Radius | 3.66858E+00 | −8.22705E+00 | −1.59254E+01 | 2.94110E+00 | 3.49978E+00 |
| K | −4.61547E−01 | −6.75560E+00 | −6.33135E+01 | 2.29781E−01 | 4.78628E−01 |
| A($4^{th}$) | 6.90044E−04 | −6.96777E−03 | −1.25315E−02 | −6.78958E−03 | −7.32572E−03 |
| B($6^{th}$) | 8.19586E−06 | 1.07672E−02 | 8.46388E−03 | −5.21788E−03 | 4.18782E−03 |
| C($8^{th}$) | 8.81449E−05 | −3.94007E−03 | 5.38831E−05 | 9.20706E−03 | 1.06018E−03 |
| D($10^{th}$) | −6.98225E−05 | −1.61665E−04 | −2.81762E−03 | −6.68498E−03 | −2.95442E−03 |
| E($12^{th}$) | 2.88527E−05 | 5.46463E−04 | 1.59843E−03 | 2.43539E−03 | 1.55919E−03 |
| F($14^{th}$) | −7.21782E−06 | −1.76674E−04 | −4.31039E−04 | −3.15281E−04 | −2.15066E−04 |
| G($16^{th}$) | 1.06695E−06 | 2.69029E−05 | 6.34258E−05 | −5.91314E−05 | −7.01203E−05 |
| H($18^{th}$) | −8.52147E−08 | −2.05527E−06 | −4.90813E−06 | 2.28760E−05 | 2.65235E−05 |
| J($20^{th}$) | 2.78919E−09 | 6.35832E−08 | 1.56983E−07 | −1.97985E−06 | −2.43362E−06 |

TABLE 14

|  | S7 | S8 | S9 | S10 | S11 |
|---|---|---|---|---|---|
| Radius | 1.53902E+01 | 1.59226E+01 | 2.97727E+00 | 3.29039E+00 | 5.35523E+00 |
| K | 6.27830E+01 | 6.43702E+01 | 4.08489E−01 | −4.34107E+00 | −3.56672E+01 |
| A($4^{th}$) | −8.91856E−02 | −6.96727E−02 | 1.93069E−02 | −4.84310E−03 | 1.27716E−02 |
| B($6^{th}$) | 3.08617E−01 | 3.49520E−01 | −2.16659E−02 | −5.22307E−02 | −3.85212E−02 |
| C($8^{th}$) | −4.61754E−01 | −6.05207E−01 | −1.94853E−02 | 9.94472E−02 | 5.87355E−02 |
| D($10^{th}$) | 3.94913E−01 | 5.69145E−01 | 1.20260E−02 | −1.41087E−01 | −7.67988E−02 |
| E($12^{th}$) | −2.04723E−01 | −3.15884E−01 | 4.93346E−02 | 1.46365E−01 | 7.40158E−02 |
| F($14^{th}$) | 6.41949E−02 | 1.03695E−01 | −6.77749E−02 | −9.54031E−02 | −4.55761E−02 |
| G($16^{th}$) | −1.14904E−02 | −1.90072E−02 | 3.62468E−02 | 3.65946E−02 | 1.67486E−02 |
| H($18^{th}$) | 9.90879E−04 | 1.62872E−03 | −9.08529E−03 | −7.54304E−03 | −3.33053E−03 |
| J($20^{th}$) | −2.14181E−05 | −3.21330E−05 | 8.87437E−04 | 6.44427E−04 | 2.75402E−04 |

From the above-described embodiments, various data about lenses may be identified in the lens assemblies (e.g., 100, 200, 300, 400, and 500) and/or an electronic device including the lens assemblies (e.g., 100, 200, 300, 400, and 500). Such data may satisfy the above-described conditions, e.g., the results of conditional equations 1 to 8.

From the above-described embodiments, various data about lenses may be identified in the lens assemblies (e.g., 100, 200, 300, 400, and 500) and/or an electronic device including the lens assemblies (e.g., 100, 200, 300, 400, and 500). Such data may satisfy the above-described conditions, e.g., the results of conditional equations 1 to 8.

TABLE 15

|  | Embodiment 1 | Embodiment 2 | Embodiment 3 | Embodiment 4 | Embodiment 5 |
|---|---|---|---|---|---|
| conditional equation 1 | −0.001 | −0.001 | −0.003 | −0.014 | 0.003 |
| conditional equation 2 | 20.09 | 20.09 | 20.09 | 10.21 | 19.61 |
| conditional equation 3 | 56.11 | 56.11 | 56.11 | 56.09 | 56.11 |
| conditional equation 4 | 1.086 | 1.047 | 0.916 | 0.719 | 1.048 |
| conditional equation 5 | 0.027 | 0.029 | 0.064 | −0.045 | 0.022 |

In Table 15 above, 'embodiment 1,' 'embodiment 2,' 'embodiment 3,' 'embodiment 4,' and 'embodiment 5' may mean the lens assembly 100 of FIG. 1, the lens assembly 200 of FIG. 5, the lens assembly 300 of FIG. 9, the lens assembly 400 of FIG. 13, and the lens assembly 500 of FIG. 17, respectively.

The above-described lens assembly (e.g., 100, 200, 300, 400, or 500) may be disposed in an electronic device. In addition to the image sensor IS, the electronic device may further include an application processor (AP) and drive an operating system (OS) or application programs stored as instructions in a memory. The application processor thereby controls multiple hardware or software components connected with the AP and performs processing and computation on various data. For example, the application processor (AP) may further include a graphic processing unit (GPU) and/or an image signal processor. When the application processor (AP) includes an image signal processor, the image (or video) obtained by the image sensor IS may be stored or output by way of the application processor.

Figure 21:
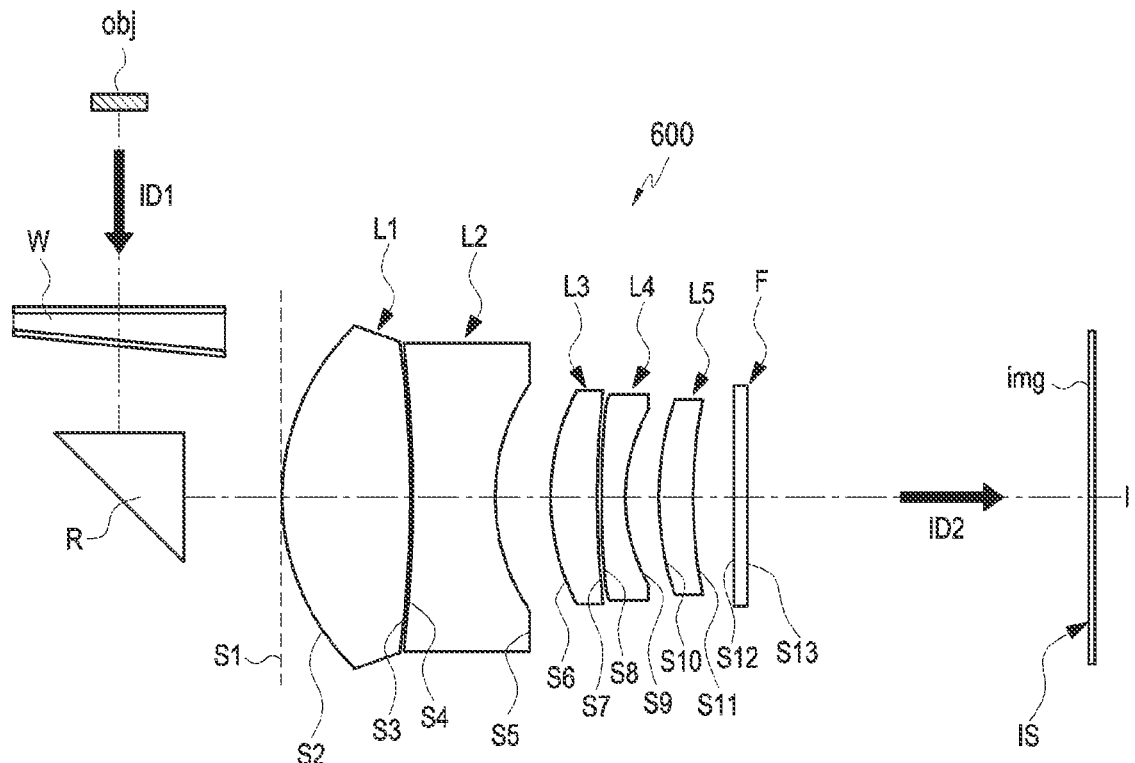
FIG. 21 is a view illustrating a configuration of an optical system including a first optical member, a second optical member, a lens assembly, and an image sensor according to an embodiment.

FIG. 21 is a view illustrating a configuration of a lens assembly 600 according to another embodiment of the disclosure. The lens assembly may further include a wedge-shaped prism W and a mirror R. The object may not be located along an axis through the centers of the lenses L1, L2, L3, L4, and L5. Light from the object may be incident in a first incident direction ID1. The mirror R may change the direction of the light to second incident direction ID2.

Referring to FIG. 21, the lens assembly 600 may further include an optical member that refracts or reflects the light incident from the outside and guides it to the first lens L1 and/or the image sensor S. The lens assembly 600 illustrated in FIG. 21 relates to, e.g., a folded optical system. For example, external light may be incident on the optical member along the first incident direction ID1 and be refracted or reflected by the optical member and proceed along the second incident direction ID2.

According to an embodiment, the optical member may include a first optical member R and a second optical member W. According to an embodiment, the first optical member R may include a mirror or a prism having a triangular cross section. The second optical member W may include a prism having a wedge-shaped cross section or a prism transformable into a wedge shape. The first optical member R may serve to change a first light path of light incident in a direction crossing the optical axis to a second light path. The second optical member W is disposed closer to the object than the first optical member and may serve to change an incident angle of the first light path ID1. The second optical member W may simply change the is directions of the light incident on the second optical member W and the light emitted therefrom, and thus may be easily applied to image sensor IS, but is prone to cause chromatic aberration. Accordingly, the lens assembly 600 (e.g., the lens assembly 100, 200, 300, 400, or 500 of FIGS. 1 to 20) may effectively reduce and/or prevent chromatic aberration although configuring a folded optical system by at least partially meeting the conditions for the above-described conditional equations (conditional equations 1 to 5), focal length, Abbe's number, and field of view.

Meanwhile, although not shown, the lens assembly 600 may further include a third optical member (not shown) disposed between the first lens (e.g., the fifth lens L5) on the side of the image sensor S and the infrared cut filter F and/or between the infrared cut filter F and the image sensor IS. The third optical member may refract or reflect the light traveling in the second incident direction ID2 and guide it to the image sensor IS along a third incident direction different from the second incident direction ID2. The third optical member may include a mirror or a prism.

According to an embodiment, when a high-performance, large-sized image sensor S is included, the captured image quality of the electronic device may be enhanced. However, as the image sensor S increases in size, the lens assembly 600 corresponding thereto may be difficult to equip in a downsized electronic device. For example, the thickness of the electronic device may increase due to the length or width of the image sensor S. Thus, according to an embodiment, the lens assembly 500 may secure a design freedom for the direction of arrangement of the lenses L1, L2, L3, L4, and L5 or the direction of placement of the image sensor IS by including at least one optical member R and/or W and may thus be easily equipped in a slim and/or compact electronic device despite an increase in the size of the image sensor IS.

Figure 22:
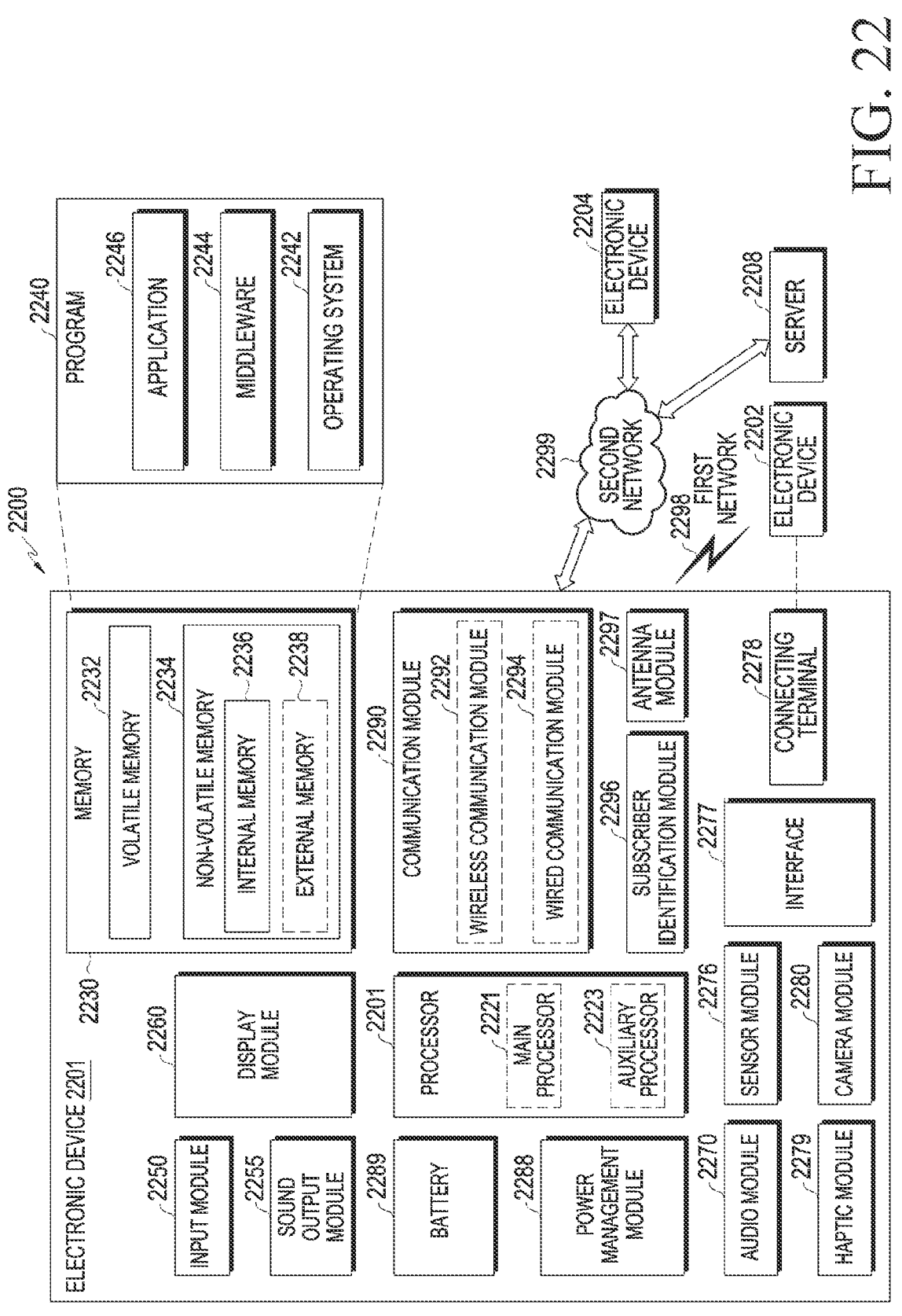
FIG. 22 is a block diagram illustrating an electronic device in a network environment according to an embodiment.

FIG. 22 is a block diagram illustrating an electronic device 2201 (e.g., an optical device0 in a network environment 2200 according to an embodiment. Referring to FIG. 22, the electronic device 2201 (e.g., an optical device0 in the network environment 2200 may communicate with at least one of an electronic device 2202 via a first network 2298 (e.g., a short-range wireless communication network), or an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2220, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one (e.g., the display module 2260 or the camera module 2280) of the components may be omitted from the electronic device 2201, or one or more other components may be added in the electronic device 101. According to an embodiment, some (e.g., the sensor module 2276, the camera module 2280, or the antenna module 2297) of the components may be integrated into a single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation. According to one embodiment, as at least part of the data processing or computation, the processor 2220 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 2201 includes the main processor 2221 and the auxiliary processor 2223, the auxiliary processor 2223 may be configured to use lower power than the main processor 2221 or to be specified for a designated function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 123. According to an embodiment, the auxiliary processor 2223 (e.g., the neural processing unit) may include a hardware structure specified for artificial intelligence model processing. The artificial intelligence model may be generated via machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The term "processor" shall be understood to refer to both the singular and plural contexts in this disclosure.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by other component (e.g., the processor 2220) of the electronic device 2201, from the outside (e.g., a user) of the electronic device 2201. The input device 2250 may include, for example, a microphone, a mouse, a keyboard, keys (e.g., buttons), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display 2260 may include, for example, a display, a hologram device, or a projector and control circuitry to control a corresponding one of the display, hologram device, and projector. According to an embodiment, the display 2260 may include a touch sensor configured to detect a touch, or a pressure sensor configured to measure the intensity of a force generated by the touch.

The audio module 2270 may convert a sound into an electrical signal and vice versa. According to an embodiment, the audio module 2270 may obtain the sound via the input module 2250, or output the sound via the sound output module 2255 or a headphone of an external electronic device (e.g., an electronic device 2202) directly (e.g., wiredly) or wirelessly is coupled with the electronic device 2201.

The sensor module 2276 may detect an operational state (e.g., power or temperature) of the electronic device 2201 or an environmental state (e.g., a state of a user) external to the electronic device 101, and then generate an electrical signal or data value corresponding to the detected state. According to an embodiment, the sensor module 2276 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, a HDMI connector, a USB connector, a SD card connector, or an audio connector (e.g., a headphone connector).

The haptic module 2279 may convert an electrical signal into a mechanical stimulus (e.g., a vibration or motion) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2192 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device 2204 via a first network 2298 (e.g., a short-range communication network, such as Bluetooth™, wireless-fidelity (Wi-Fi) direct, or infrared data association (IrDA)) or a second network 2299 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 2292 may identify or authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2297 may transmit or receive a signal or power to or from the outside (e.g., the external electronic device). According to an embodiment, the antenna module 2297 may include one antenna including a radiator formed of a conductor or conductive pattern formed on a substrate (e.g., a printed circuit board (PCB)). According to an embodiment, the antenna module 2297 may include a plurality of antennas (e.g., an antenna array). In this case, at least one antenna appropriate for a communication scheme used in a communication network, such as the first network 2298 or the second network 2299, may be selected from the plurality of antennas by, e.g., the communication module 2290. The signal or the power may then be transmitted or received between the communication module 2290 and the external electronic device via the selected at least one antenna. According to an embodiment, other parts (e.g., is radio frequency integrated circuit (RFIC)) than the radiator may be further formed as part of the antenna module 2297.

According to an embodiment, the antenna module 2297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. The external electronic devices 2202 and 2204 each may be a device of the same or a different type from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example.

The electronic device 2201 may provide ultra low-latency services using, e.g., distributed computing or mobile edge computing. In another embodiment, the external electronic device 2204 may include an Internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or health-care) based on 5G communication technology or IoT-related technology.

Figure 23:
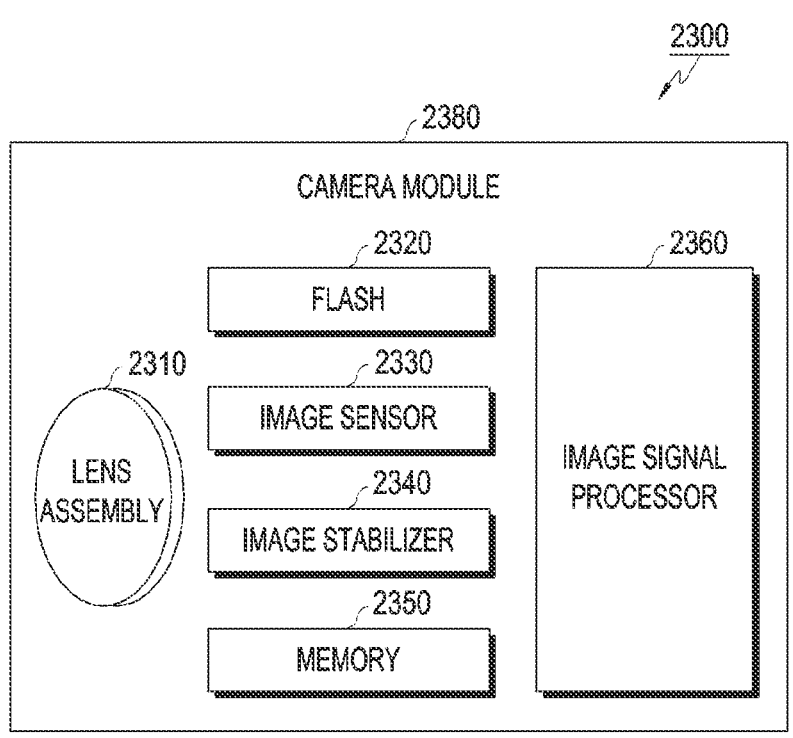
FIG. 23 is a block diagram illustrating a camera module according to an embodiment.

FIG. 23 is a block diagram 2300 illustrating the camera module 2380 according to an embodiment. Referring to FIG. 23, the camera module 2380 may include a lens assembly 2310 (e.g., the lens assembly 100 of FIG. 1, the lens assembly 200 of FIG. 6, or the lens assembly 300 of FIG. 10), a flash 2320, an image sensor 2330 (e.g., the image sensor IS of FIGS. 1, 6, and 10), an image stabilizer 2340, a memory 2350 (e.g., a buffer memory) (e.g., the memory 2230 of FIG. 22), or an image signal processor 2360. The lens assembly 2310 may collect light emitted or reflected from an object whose image is to be taken. The lens assembly 2310 may include one or more lenses. According to an embodiment, the camera module 2380 may include a plurality of lens assemblies 2310. In such a case, the camera module 2380 may form, for example, a dual camera, a 360-degree camera, or a spherical camera. Some of the plurality of lens assemblies 2310 may have the same lens attribute (e.g., view angle, focal length, auto-focusing, f number (Fno), or optical zoom), or at least one lens assembly may have one or more lens attributes different from those of another lens assembly. The lens assembly 2310 may include, for example, a wide-angle lens or a telephoto lens.

The flash 2320 may emit light that is used to reinforce light reflected from an object. According to an embodiment, the flash 2320 may include one or more light emitting diodes (LEDs) (e.g., a red-green-blue (RGB) LED, a white LED, an infrared (IR) LED, or an ultraviolet (UV) LED) or a xenon lamp. The image sensor 2330 may obtain an image corresponding to an object by converting light emitted or reflected from the object and transmitted via the lens assembly 2310 into an electrical signal. According to an embodiment, the image sensor 2330 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 2330 may be implemented using, for example, a charged coupled device (CCD) sensor or a complementary metal oxide semiconductor (CMOS) sensor.

The image stabilizer 2340 may move the image sensor 2330 or at least one lens included in the lens assembly 2310 in a particular direction, or control an operational attribute (e.g., adjust the read-out timing) of the image sensor 2330 in response to the movement of the camera module 2380 or the electronic device 2201 including the camera module 180. This allows compensating for at least part of a negative effect (e.g., image blurring) by the movement on an image being captured. According to an embodiment, the image stabilizer 2340 may sense such a movement by the camera module 2380 or the electronic device 2201 using a gyro sensor (not shown) or an acceleration sensor (not shown)

disposed inside or outside the camera module 2380. According to an embodiment, the image stabilizer 2340 may be implemented, for example, as an optical image stabilizer. The memory 2350 may store, at least temporarily, at least part of an image obtained via the image sensor 2330 for a subsequent image processing task. For example, if image capturing is delayed due to shutter lag or multiple images are quickly captured, a raw image obtained (e.g., a Bayer-patterned image, a high-resolution image) may be stored in the memory 2350, and its corresponding copy image (e.g., a low-resolution image) may be previewed via the display module 2260. Thereafter, if a specified condition is met (e.g., by a user's input or system command), at least part of the raw image stored in the memory 2350 may be obtained and processed, for example, by the image signal processor 2360. According to an embodiment, the memory 2350 may be configured as at least part of the memory 2330 or as a separate memory that is operated independently from the memory 130.

The image signal processor 2360 may perform one or more image processing with respect to an image obtained via the image sensor 2330 or an image stored in the memory 2350. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 2360 may perform control (e.g., exposure time control or read-out timing control) with respect to at least one (e.g., the image sensor 2330) of the components included in the camera module 2380. An image processed by the image signal processor 2360 may be stored back in the memory 2350 for further processing, or may be provided to an external component (e.g., the memory 2230, the display module 2260, the electronic device 2202, the electronic device 2204, or the server 2208) outside the camera module 2380. According to an embodiment, the image signal processor 2360 may be configured as at least part of the processor 2220, or as a separate processor that is operated independently from the processor 2220. If the image signal processor 2360 is configured as a separate processor from the processor 2320, at least one image processed by the image signal processor 2360 may be displayed, by the processor 2320, via the display module 2360 as it is or after being further processed.

According to an embodiment, the electronic device 2201 may include a plurality of camera modules 2380 having different attributes or functions. In such a case, at least one of the plurality of camera modules 2380 may form, for example, a wide-angle camera and at least another of the plurality of camera modules 180 may form a telephoto camera. Similarly, at least one of the plurality of camera modules 2380 may form, for example, a front camera and at least another of the plurality of camera modules 180 may form a rear camera.

The electronic device according to an embodiment may be one of various types of devices. The electronic devices may include, for example, a portable communication device (e.g., a smart phone), a computer device, a portable multimedia device, a portable medical device, a camera, a wearable device, or a home appliance. According to an embodiment of the present invention, the electronic device is not limited to the above-listed embodiments.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

According to an embodiment of the disclosure, there may be provided an electronic device comprising: a lens assembly including a plurality of lenses arranged along a direction of an optical axis from an object side to an image side an optical member disposed closer to the object side than the lens assembly and configured to reflect or refract external light incident in a direction crossing the optical axis to be incident on the lens assembly along the direction of the optical axis; and an image sensor; wherein the plurality of lenses include a first lens, a second lens, a third lens, and a fourth lens sequentially arranged along the direction of the optical axis, and wherein the lens assembly satisfies conditional equation 1 and conditional equation 2.

$$\left|\sum \frac{f}{f_i v_d}\right| \le 0.05$$ [conditional equation 1]

$$FOV \le 25 \ deg$$ [conditional equation 2]

where, 'f' is a focal length of each of the lenses except for a lens closest to the image side among the plurality of lenses included in the lens assembly, '$f_t$' is a focal length of an optical system, and '$v_d$' is an Abbe's number of each lens, and 'FOV' is a field of view of the optical system.

According to an embodiment, the lens assembly may further include a fifth lens disposed between the fourth lens and the image sensor.

According to an embodiment, the electronic device may further satisfy conditional equation 3 below.

$$Vdl > 50$$ [conditional equation 3]

where 'vdl' is an Abbe's number of a lens closest to the image side in the lens assembly.

According to an embodiment, the electronic device may further satisfy conditional equation 4 below.

$$0.8 < R\_L1S2/R\_L3S6 < 2$$ [conditional equation 4]

where:
R_L1S2 is a radius of curvature of an object-side surface of the first lens, and
R_L3S6 is a radius of curvature of an object-side surface of the third lens.

According to an embodiment, the electronic device may further satisfy conditional equation 5 below.

$$\left|\sum_{i=1}^{n} \frac{f_i}{f_t v_i}\right| \le 0.5$$

where:
'$f_i$' is a focal length of each lens included in the lens assembly,
'$f_t$' is focal length of an optical system, and
'$v_i$' is an Abbe's number of each lens.

According to an embodiment, the first lens may have a positive refractive power, the second lens may have a negative refractive power, the third lens may have a positive refractive power, and the fourth lens may have a negative refractive power.

According to an embodiment, the electronic device further comprises a first optical member configured to change a first light path of light incident in the direction crossing the optical axis to a second light path and a second optical member disposed closer to the object side than the first optical member and capable of changing an incident angle of the first light path.

According to an embodiment, the first optical member may include a mirror or a prism having a triangular cross section. The second optical member may include a prism having a wedge-shaped cross section or includes a prism transformable into a wedge shape.

According to an embodiment, wherein the first lens, second lens, third lens, and fourth lens, the first optical member, or the second optical member are configured to stabilize an image provided to the image sensor.

According to an embodiment, the electronic device may further comprise a third optical member disposed between a lens closest to the image side in the lens assembly and the image sensor.

According to an embodiment of the disclosure, there may be provided an electronic device, comprising a lens assembly including a first lens having a positive refractive power, a second lens having a negative refractive power, a third lens having a positive refractive power, and a fourth lens having a negative refractive power and fifth lens, wherein the first lens, second lens, third lens, fourth lens, and fifth lens are sequentially arranged along a direction of an optical axis from an object side to an image side; and an image sensor; wherein the lens assembly satisfies conditional equation 1 and conditional equation 2, $$\left|\sum \frac{f}{f_i v_d}\right| \le 0.05$$ [conditional equation 1]

$$FOV \le 25 \ deg$$ [conditional equation 2]

where 'f' is a focal length of each of the lenses except for the fifth lens, '$f_t$' is a focal length of an optical system, and '$v_d$' is an Abbe's number of each lens, and 'FOV' is a field of view of the optical system.

According to an embodiment, the electronic device satisfies conditional equation 3, $$vdl > 50$$ [conditional equation 3]

where 'vdl' is an Abbe's number of the fifth lens.

According to an embodiment, the electronic device satisfies conditional equation 4, $$0.8 < R\_L1S2/R\_L3S6 < 2$$ [conditional equation 4]

where:

R_L1S2 is a radius of curvature of an object-side surface of the first lens, and R_L3S6 is a radius of curvature of an object-side surface of the third lens.

According to an embodiment, the electronic device satisfies equation 5:

$$\left| \sum_{i=1}^{n} \frac{f_i}{f_t v_i} \right| \leq 0.5$$

where:

'fi' is a focal length of each lens included in the lens assembly,

'ft' is focal length of the optical system

'vi' is an Abbe's number of each lens.

According to an embodiment, the electronic device further comprises: at least one optical member disposed adjacent to the lens assembly; and wherein the lens assembly and at least one optical member a folded optical device.

According to an embodiment, the electronic device further comprises another optical member disposed closer to the object side than the lens assembly and configured to reflect or refract external light incident in a direction crossing the optical axis to be incident on the lens assembly along the direction of the optical axis.

According to an embodiment, the at least one optical member changes a first light path of light incident in the direction crossing the optical axis to a second light path and the another optical member disposed closer to the object side than the at least one optical member and capable of changing an incident angle of the first light path.

According to an embodiment, the at least one optical member includes a mirror or a triangular prism, and the another optical member includes a wedge-shaped prism or includes a prism transformable into a wedge shape.

According to an embodiment, the lens assembly, the at least one optical member, or the another optical member stabilize an image provided by the lens assembly to the image sensor.

According to an embodiment, the electronic device further comprises a third optical member disposed between the fifth lens in the lens assembly and the image sensor.

While the present invention has been shown and described with reference to exemplary embodiments thereof, it will be apparent to those of ordinary skill in the art that various changes in form and detail may be made thereto without departing from the spirit and scope of the present invention as defined by the following claims. For example, the measurements of the plurality of lenses may be properly set depending on the structure, specifications, or actual use environment of the lens assembly as actually manufactured or an electronic device equipped with the lens assembly.

What is claimed is:

1. An electronic device comprising:

a lens assembly including a plurality of lenses arranged along a direction of an optical axis from an object side to an image side;

at least one optical member disposed closer to the object side than the lens assembly and configured to reflect or refract external light incident in a direction crossing the optical axis to be incident on the lens assembly along the direction of the optical axis; and an image sensor;

wherein the plurality of lenses include a first lens, a second lens, a third lens, and a fourth lens sequentially arranged along the direction of the optical axis, and wherein the lens assembly satisfies conditional equation 1, conditional equation 2 and conditional equation 4, $$\left| \sum \frac{f}{f_t v_d} \right| \leq 0.05 \qquad \text{[conditional equation 1]}$$

$$FOV \leq 25 \ deg \qquad \text{[conditional equation 2]}$$

where 'f' is a focal length of each of the lenses except for a lens closest to the image side among the lenses included in the lens assembly, '$f_t$' is a focal length of an optical system, and '$v_d$' is an Abbe's number of the first lens, the second lens, the third lens, and the fourth lens, and 'FOV' is a field of view of the optical system $$0.99 < R\_L1S2/R\_L3S6 < 1.15 \qquad \text{[conditional equation 4]}$$

where:

R_L1S2 is a radius of curvature of an object-side surface of the first lens and

R_L3S6 is a radius of curvature of an object-side surface of the third lens, wherein the at least one optical member comprises a first optical member (R) configured to change a first light path of light incident in a direction crossing the optical axis to a second light path, and a second optical member (W) disposed closer to the object side than the first optical member and is configured to cause chromic aberration and capable of changing an incident angle of the first light path, wherein the first optical member (R) is configured to correct the chromic aberration caused by the second optical member, and wherein the plurality of lenses included in the lens assembly, the first optical member, or the second optical member are configured to stabilize an image provided to the image sensor, wherein the first optical member includes a mirror or a right-angled prism having a triangular cross section, and wherein the second optical member includes a prism having a wedge-shaped cross section or includes a prism transformable into a wedge shape.

2. The electronic device of claim 1, wherein the lens assembly further includes a fifth lens disposed between the fourth lens and the image sensor.

3. The electronic device of claim 2, wherein the electronic device satisfies conditional equation 3, $$vdl > 50 \qquad \text{[conditional equation 3]}$$

where 'vdl' is an Abbe's number of a lens closest to the image side in the lens assembly.

4. The electronic device of claim 1, wherein the electronic device satisfies conditional equation 5, $$\left| \sum_{i=1}^{n} \frac{f_i}{f_t v_i} \right| \leq 0.5 \qquad \text{[conditional equation 5]}$$

where:

'$f_i$' is a focal length of each lens included in the lens assembly,

'$f_t$' is focal length of the optical system,

'$v_i$' is an Abbe's number of each lens.

5. The electronic device of claim 1, wherein the first lens has a positive refractive power, the second lens has a negative refractive power, the third lens has a positive refractive power, and the fourth lens has a negative refractive power.

6. The electronic device of claim 1, further comprising a third optical member disposed between a lens closest to the image side in the lens assembly and the image sensor.

7. An electronic device including a lens assembly, comprising:

a lens assembly including:

a first lens having a positive refractive power, a second lens having a negative refractive power, a third lens having a positive refractive power, a fourth lens having a negative refractive power, and a fifth lens, wherein the first lens, second lens, third lens, fourth lens, and fifth lens are sequentially arranged along a direction of an optical axis from an object side to an image side; and an image sensor;

wherein the lens assembly satisfies conditional equation 1, conditional equation 2, and conditional equation 5, $$\left| \sum \frac{f}{f_i v_d} \right| \le 0.05 \qquad \text{[conditional equation 1]}$$

$$FOV \le 25 \ deg \qquad \text{[conditional equation 2]}$$

where 'f' is a focal length of each of the lenses except for the fifth lens, '$f_t$' is a focal length of an optical system, and '$v_d$' is an Abbe's number of the first lens, the second lens, the third lens, and the fourth lens, and 'FOV' is a field of view of the optical system $$\left| \sum_{i=1}^{n} \frac{f_i}{f_t v_i} \right| \le 0.5, \qquad \text{[conditional equation 5]}$$

where:

'$f_i$' is a focal length of each lens included in the lens assembly,

'$v_i$' is an Abbe's number of each lens, and a first optical member (R) configured to change a first light path of light incident in a direction crossing the optical axis to a second light path, and a second optical member (W) disposed closer to the object side than the first optical member, is capable of changing an incident angle of the first light path, and is configured to cause chromic aberration and capable of changing an incident angle of the first light path, wherein the first optical member (R) is configured to correct the chromic aberration caused by the second optical member, wherein the lens assembly, the first optical member, or the second optical member are configured to stabilize an image provided to the image sensor, and wherein the first optical member includes a mirror or a right-angled prism having a triangular cross section, and wherein the second optical member includes a prism having a wedge-shaped cross section or includes a prism transformable into a wedge shape.

8. The electronic device of claim 7, wherein the electronic device satisfies conditional equation 3, $$vdl > 50 \qquad \text{[conditional equation 3]}$$

where 'vdl' is an Abbe's number of the fifth lens.

9. The electronic device of claim 7, wherein the electronic device satisfies conditional equation 4, $$0.8 < R\_L1S2/R\_L3S6 < 2 \qquad \text{[conditional equation 4]}$$

where:

R_L1S2 is a radius of curvature of an object-side surface of the first lens, and R_L3S6 is a radius of curvature of an object-side surface of the third lens.

10. The electronic device of claim 7, further comprising:

at least one optical member disposed adjacent to the lens assembly; and wherein the lens assembly and at least one optical member form a folded optical device.

11. The electronic device of claim 10, further comprising:

another optical member disposed closer to the object side than the lens assembly and configured to reflect or refract external light incident in a direction crossing the optical axis to be incident on the lens assembly along the direction of the optical axis.

12. The electronic device of claim 7, wherein the at least one optical member includes a mirror or a triangular prism, and wherein the another optical member includes a wedge-shaped prism or includes a prism transformable into a wedge shape.

13. The electronic device of claim 11, further comprising a third optical member disposed between the fifth lens in the lens assembly and the image sensor.

\* \* \* \* \*